US007886283B2

(12) United States Patent
Nacul et al.

(10) Patent No.: US 7,886,283 B2
(45) Date of Patent: Feb. 8, 2011

(54) PHANTOM SERIALIZING COMPILER AND METHOD OF OPERATION OF SAME

(75) Inventors: Andre Nacul, Irvine, CA (US); Tony Givargis, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 1506 days.

(21) Appl. No.: 11/227,781

(22) Filed: Sep. 14, 2005

(65) Prior Publication Data
US 2006/0112377 A1    May 25, 2006

Related U.S. Application Data

(60) Provisional application No. 60/610,705, filed on Sep. 17, 2004.

(51) Int. Cl.
*G06F 9/45*    (2006.01)
(52) U.S. Cl. .................................. 717/137; 717/157
(58) Field of Classification Search .................. 717/137
See application file for complete search history.

(56) References Cited

U.S. PATENT DOCUMENTS

| 6,077,313 A * | 6/2000 | Ruf ............................. 717/155 |
| 2004/0010754 A1* | 1/2004 | Jones .......................... 715/513 |

OTHER PUBLICATIONS

Guilherme Ottoni, Ram Rangan, Adam Stoler, and David I. Aug. 2005. Automatic Thread Extraction with Decoupled Software Pipelining. In Proceedings of the 38th annual IEEE/ACM International Symposium on Microarchitecture (MICRO 38). IEEE Computer Society, Washington, DC, USA, 105-118. DOI=10.1109/MICRO.2005.13 http://dx.doi.org/10.1109/MICRO.2005.*

* cited by examiner

*Primary Examiner*—James D Rutten
(74) *Attorney, Agent, or Firm*—Marcus C. Dawes; Daniel L. Dawes

(57) ABSTRACT

An alternative to a real time operating system (RTOS) is provided based on serializing compilers. A serializing compiler can transform a multitasking application into an equivalent and optimized monolithic sequential code, to be compiled with the embedded processor's native optimizing compiler, effectively filling the RTOS gap. The serializing compiler can analyze the tasks at compile time and generate a fine-tuned, application specific infrastructure to support multitasking, resulting in a more efficient executable than one that is intended to run on top of a generic RTOS. By having control over the application execution and context switches, the serializing compiler enables the fine grain control of task timing while enhancing overall performance. The serializing compiler technology strengthens existing compilers, making them timing and task-aware. The Phantom compiler provides a fully automated mechanism to synthesize a single threaded, ANSI C/C++ program from a multithreaded C/C++ (extended with POSIX) program.

51 Claims, 12 Drawing Sheets

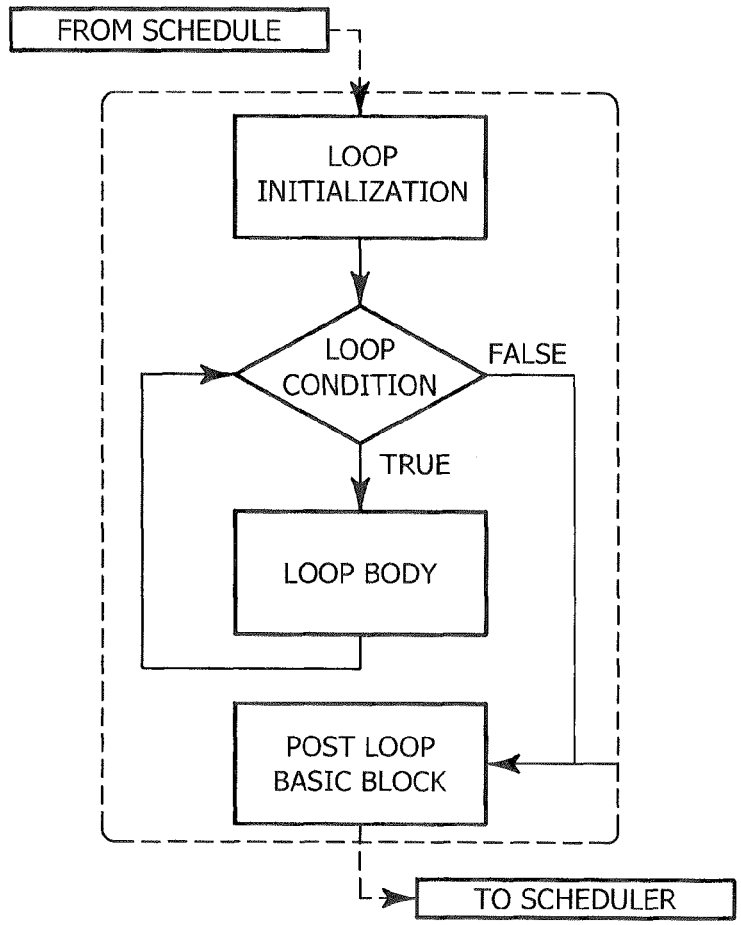
```
1   aeb1 :
2       a=10;
3       b=0;
4   loop:
5      if (a>b) {
6         b=rand () ;
7         print (b) ;
8            goto   loop;
9      }
10      print (a) ;
11      next _ aeb=2;
12      return ;
13  aeb2:
         . . .
```
(a) PARTITIONING DIAGRAM             (B) SAMPLE CODE SEGMENT
*FIG. 13A*                           *FIG. 13B*

```
1   aeb1 :
2     a=10 ;
3     b=0 ;
4     next_ aeb=2 ;
5     return ;
6   aeb2 :
7     if (a>b)   {
8       b=rand () ;
9       print (b) ;
10      return ;
11    }
12    next_ aeb=3 ;
13    return ;
14  aeb3:
15    print (a) ;
16    next_ aeb=4 ;
17    return ;
18  aeb4:
       . . .
```

(b) SAMPLE CODE SEGMENT (a) PARTITIONING DIAGRAM

```
1   aeb1 :
2     a=10 ;
3     b=0 ;
4     next _ aeb=2 ;
5     return ;
6   aeb2 :
7     for (i=0 ; i<N ; i++)
8       if (a>b) {
9         b=rand() ;
10        print (b) ;
11        continue ;
12      }
13      next_aeb=3 ;
14      return ;
15    }
16    return ;
17  aeb3 :
18    print (a) ;
19    next_aeb=4 ;
20    return ;
21  aeb4 :
      . . .
```

(b) SAMPLE CODE SEGMENT (a) PARTITIONING DIAGRAM

PHANTOM SERIALIZING COMPILER AND METHOD OF OPERATION OF SAME

RELATED APPLICATIONS

The present application is related to U.S. Provisional Patent Application Ser. No. 60/610,705, filed on Sep. 17, 2004, which is incorporated herein by reference and to which priority is claimed pursuant to 35 USC 119.

GOVERNMENT RIGHTS

This invention is made with Government Support under Grant No. 0205712, awarded by the National Science Foundation. The Government has certain rights in this invention.

BACKGROUND OF THE INVENTION

1. Field of the Invention

The invention relates to the field of multitasking applications targeted at embedded processors.

2. Description of the Prior Art

The functional complexity of embedded software or software which is dedicated to a special purpose continues to rise due to a number of factors such as consumer demand for more functionality, sophisticated user interfaces, seamless operation across multiple communication and computation protocols, need for encryption and security, and so on. Consequently, the development of embedded software poses a major design challenge. At the same time, the elevated level of abstraction provided by a high-level programming paradigm immensely facilitates a short design cycle, fewer design errors, design portability, and intellectual property reuse.

In particular, the concurrent programming paradigm is an ideal model of computation for design of embedded systems, which often encompass inherent concurrency. An embedded system is a special-purpose computer system, which is completely encapsulated by the device it controls. Concurrency is concerned with the sharing of common resources between computations which executed overlapped in time including running in parallel. This often entails finding reliable techniques for coordinating their execution, exchanging data, allocating memory and scheduling processing time in such a way as to minimized response time and maximise throughput. Concurrent systems such as operating systems are designed to operate indefinitely and not terminate unexpectedly.

Furthermore, embedded systems often have stringent performance requirements (e.g., timing, energy, etc.) and, consequently, require a carefully selected and performance tuned embedded processor to meet specified design constraints. In recent years, a plethora of highly customized embedded processors have become available. For example, Tensilica provides a large family of highly customized application-specific embedded processors (a.k.a., the Xtensa). Likewise, ARM and MIPS provide several derivatives of their respective core processors, in an effort to provide to their customers an application-specific solution. These embedded processors ship with cross-compilers and the associated tool chain for application development. A cross compiler is a compiler capable of creating executable code for another platform than the one on which the cross compiler is run. Such a tool is needed when you want to compile code for a platform to which there is no access, or because it is inconvenient or impossible to compile on that platform as is the case with embedded systems.

However, to support a multitasking application development environment, there is a need for an operating system (OS) layer that can support task creation, task synchronization, and task communication. Such OS support is seldom available for each and every variant of the base embedded processor. In part, this is due to the lack of system memory and/or sufficient processor performance (e.g., in the case of microcontrollers such as the Microchip PIC and the Phillips 8051) coupled with the high performance penalty of having a full-fledged OS.

Additionally, manually porting and verifying an OS to every embedded processor available is costly in terms of time and money, and there is no guarantee of correctness. Thus, there exists a gap in technology in relation to creating a multitasking application targeted at a particular embedded processor.

The problem of multitasking support is typically solved using an operating system layer (OS). The OS will maintain information about each task that is running, and will share the processor among the running tasks. Such OS support imposes a performance and memory overheads to the application, usually slowing down the execution. Moreover, the OS infrastructure is generic, designed to perform reasonably well across multiple applications, and must be manually ported to run in different processors. The porting process is long, costly, and could introduce further bugs in the software.

As for automation, there are two approaches that propose solutions for automatically handling the execution of multitasking code. One of them is called a "template-based approach", where an OS infrastructure is derived from a generic OS only with the constructs needed by the application. It generates a trimmed down OS based on the results of the analysis of the application code. This is a generic approach, which is clearly not the best for embedded systems design.

The second approach is static scheduling. With static scheduling, it is possible to solve the class of problems with a static, a priori known set of tasks. It is an automated solution that generates efficient code. However, the input is restricted, as not all generally used constructs are allowed. Moreover, the set of tasks has to be known beforehand, therefore dynamic tasks are not supported. A task as used here is an execution path through address space. In other words, a set of program instructions is loaded in memory. The address registers have been loaded with the initial address of the program. At the next clock cycle, the CPU will start execution in accord with the program. The sense is that some part of a plan is being accomplished. As long as the program remains in this part of the address space, the task can continue, in principle, indefinitely, unless the program instructions contain a halt, exit, or return. In the computer field, 'task' has the sense of a real-time application, as distinguished from process, which takes up space (memory), and execution time.

Finally, the serialization process, i.e. the conversion of an object instance to a data stream of byte values in order to prepare it for transmission, might generate more than one task in the generated code, enforcing the use of extra infrastructures to manage the generated tasks. These extra infrastructures are not automatically generated, and it is up to the designer to manually select and port the one that is judged as more appropriate.

More specifically, there are three categories of prior art approaches that partially address the multitasking problem for embedded processors stated above, namely, a class of virtual machine (VM) based techniques, a class of template based OS generation techniques, and a class of static scheduling techniques. An understanding of each of these will assist in understanding the differences provided by the invention as described in the detail description of the preferred embodiments below.

Consider first, VM based techniques. In the VM based techniques, an OS providing a multitasking execution environment is implemented to run on a virtual processor. A compiler for the VM is used to map the application program onto the VM. The virtual processor is in turn executed on the target processor. Portability here is achieved by porting the VM to the desired target embedded processor. Porting is the adaptation of a piece of software so that it will function in a different computing environment to that for which it was originally written. Porting is usually required because of differences in the central processing unit, operating system interfaces, different hardware, or because of subtle incompatibilities in, or even complete absence of, the programming language used on the target environment.

The advantages of this class of techniques are that the application and OS code do not require recompilation when moving to a different embedded processor. The disadvantage of this class of techniques is the significant performance penalty (i.e., speed, energy, and memory footprint) incurred by the VM layer, and specifically the VM instruction set interpreter. Moreover, the porting of the VM to the target embedded processor may require more than recompilation efforts. Examples of such VM based techniques are Java and C#. Research in this area tries to address the above-mentioned disadvantages by proposing customized VM for embedded applications or just in time (JIT) compilation techniques.

Consider now template based techniques. In the template-based OS generation techniques, a reference OS is used as a template in generating customized derivatives of the OS for particular embedded processors. This class of techniques mainly relies on inclusion or exclusion of OS features depending on application requirements and embedded processor resource availabilities. The disadvantage of this class of techniques is that no single generic OS template can be used in all of the embedded processors available. Instead, for optimal performance, a rather customized OS template must be made available for each different line or family of embedded processor. In addition, for each specific embedded processor within a family, an architecture model must be provided to the generator engine.

In one example, the prior art approach used the SpecC language, a system-level language, as an input to a refinement tool. The refinement tool partitions the SpecC input into application code and OS partitions. The OS partition is subsequently refined to a final implementation. The mechanism used in this refinement is based on matching needed OS functionality against a library of OS functions. In a similar approach, it has been proposed to use a method based on an API providing OS primitives to the application programmer. This OS template is used to realize the subset of the API that is actually used in the application program. An API is an application program interface, a set of routines, protocols, and tools for building software applications. A good API makes it easier to develop a program by providing all the building blocks. A programmer puts the blocks together. Most operating environments, such as MS-Windows, provide an API so that programmers can write applications consistent with the operating environment. Although APIs are designed for programmers, they are ultimately good for users because they guarantee that all programs using a common API will have similar interfaces. This makes it easier for users to learn new programs.

Finally, it has also been proposed to provide an environment for OS generation similar to the previous approaches. Here, a library of OS components that are parameterized is used to synthesize the target OS given a system level description of application program.

Turn now to the category of static scheduling techniques. In the static scheduling based techniques, it is assumed that the application program consists of a static and a priori known set of tasks. Given this assumption, it is possible to compute a static execution schedule, in other words, an interleaved execution order and generate an equivalent monolithic program. The advantage of this class of approaches is that the generated program is application-specific and thus highly efficient. The disadvantage of this class of techniques is that dynamic multitasking is not possible.

In a more specific example, it has been proposed to use a technique that takes as input an extended C code that includes primitives for inter-task communication based on channels or the routes following by the information, as well as primitives for specifying tasks and generates ANSI C code. The mechanism here is to model the static set of tasks using a Petri Net and generate code simulating a correct execution order of the Petri Net. A Petri net, also known as a place/transition net or P/T net, is one of several mathematical representations of discrete distributed systems. One important aspect to note in both prior art approaches is that the generated code could still be multitasking, thus requiring the existence of an OS layer that can schedule and manage the generated tasks.

Embedded software is characterized by a set of concurrent, deadline-driven, synchronized, and communicating tasks. Hence, embedded software is best captured using the real-time concurrent programming model. Therefore, there exists a gap between the desired programming abstractions (i.e., real-time concurrent programming model) and the default embedded platform programming abstractions (i.e., sequential programming model supported by an optimizing compiler from an embedded processor core vendor). The support for real time concurrent programming is usually provided by a real time operating system (RTOS). The RTOS is a software layer that runs between the user-level tasks and the embedded processor, controlling task execution, timing constraints, and access to devices, in addition to providing synchronization and communication facilities. Some commercially available RTOSs include eCos, VxWorks, and microC/OS.

In general, an RTOS is built as a generic framework which can be used across a large number of processors and applications. An RTOS provides coarse grained timing support, and is loosely coupled to the running tasks. As a results, an RTOS, in terms of resource usage efficiency and performance, is seldom optimized for any particular application. Additionally, the heavy-weight nature of an RTOS prohibits its use in applications where the underlying hardware platform is based on low-end microcontrollers.

Instead of relying on a "one-size-fits-all" template, what is needed is some kind of solution, which is able to optimize execution and resource usage.

BRIEF SUMMARY OF THE INVENTION

The illustrated embodiment of the invention provides an alternative to an RTOS based on the idea of serializing compilers. A serializing compiler is an automated software synthesis methodology that can transform a multitasking application into an equivalent and optimized monolithic sequential code, to be compiled with the embedded processor's native optimizing compiler, effectively filling the RTOS gap. The serializing compiler can analyze the tasks at compile time and generate a fine-tuned, application specific infrastructure to support multitasking, resulting in a more efficient executable than one that is intended to run on top of a generic RTOS. By having control over the application execution and context switches, the serializing compiler enables the fine grain control of task timing while enhancing overall performance.

The serializing compiler technology of the illustrated embodiment strengthens existing compilers, making them timing and task-aware. The Phantom compiler, which is the illustrated embodiment of a serializing compiler, provides a fully automated mechanism to synthesize a single threaded, ANSI C/C++ program from a multithreaded C/C++ (extended with POSIX) program. The Phantom generated code is highly tuned for the input application.

The illustrated embodiment of the invention includes a computer and a method of operating a computer to generate a program for an embedded processor comprising the steps of: compiling a multitask application with a generic front-end compiler to generate a basic block (BB) control flow graph (CFG) of the multitask application; generating non-preemptive blocks of code from the control flow graph (CFG) with a partitioning module, which blocks of code are defined as AEBs (atomic execution blocks); performing a live variable analysis on the AEB graphs to generate a live variable result; feeding back to the live variable result to the partitioning module to refine the partitions until acceptable preemption, timing, and latency are achieved, the AEB graphs having determined AEB nodes; and generating a corresponding executable code for each AEB node in a code generator.

The illustrated embodiment is a fully automated source-to-source translator, defined as a phantom compiler or simply phantom, that takes a multitasking C program as input and generates an equivalent, embedded processor independent, single-threaded ANSI C program, to be compiled using an embedded processor-specific tool chain. A tool chain is the set of computer programs, here also called tools, that are used to create a product, typically another computer program or system of programs. The tools may be used in a chain, so that the output of each tool becomes the input for the next, but the term is used widely to refer to any set of linked development tools. A simple software development tool chain consists of a text editor for entering source code, a compiler and linker to transform the source code into an executable program, and libraries to provide interfaces to the operating system. In general, a complex product such as a video game needs tools for preparing sound effects, music, textures, 3-dimensional models, and animations, and further tools for combining these resources into the finished product.

A brief description of a threaded program may be helpful. A thread is defined as an independent stream of instructions that can be scheduled to run as such by the operating system. The concept of a "procedure" that runs independently from its main program may best describe a thread. A program that contains a number of procedures, which can be scheduled to run simultaneously and/or independently by the operating system is a "multi-threaded" program. Thus, a single-threaded ANSI C program has a single stream of instructions that can be scheduled to run by the operating system.

The output of the tools of the illustrated embodiment of the invention is a highly tuned, correct-by-construction ANSI C program that embodies the application-specific embedded scheduler and dynamic multitasking infrastructure along with the user code. In operating systems, a scheduler is a program that coordinates the use of shared resources, such as a printer.

The illustrated embodiment of the invention specifically addresses the dynamic multitasking issue. Moreover, the illustrated technique is orthogonal to such static scheduling, i.e. both approaches can be used without interfering with each other. For example, the set of a priori known static tasks can be scheduled using static scheduling, while the dynamically created tasks can be handled by a technique similar to the illustrated technique.

The multitask C application is compiled with a generic front-end compiler to obtain the basic block (BB) control flow graph (CFG) representation. This intermediate BB representation is annotated, identifying system primitives. The resulting structure is used by a partitioning module to generate non-preemptive blocks of code, which we call AEBs (atomic execution blocks), to be executed by the scheduler. Scheduling is a key concept in multitasking and multiprocessing operating system design, and in real-time operating system design. It refers to the way processes are assigned priorities in a priority queue. This assignment is carried out by software known as a scheduler.

Every task in the original code is potentially partitioned into many AEBs, generating an AEB Graph. Then, a live variable analysis is performed on the AEB graphs and the result is fed back to the partitioning module to refine the partitions until acceptable preemption, timing, and latency are achieved. Latency is defined as the period of time that one component in a system is waiting for another component. Latency, therefore, is inactive or down time for a component. For example, in accessing data on a disk, latency is defined as the time it takes to position the proper sector under the read/write head. Live variable analysis is defined as an analysis which determines which variables have their values carried over to another AEB, as opposed to variables that would be used only internally in an AEB and not exported or imported from other AEB's. The resulting AEB graphs are then pased to the code generator to output the corresponding ANSI C code for each AEB node. In addition, the embedded scheduler along with other C data structures and synchronization APIs are included from the system support library, resulting in the final ANSI C single-threaded code.

All the problems discussed above in the prior art are addressed by the illustrated embodiment. We have a solution that is fully automated, and that generates the complete multitasking infrastructure that will be needed by the application. The solution is fully automated, in the sense that no manual intervention is needed during the code generation process. The generated code is more efficient than using a generic OS infrastructure or template. Specifically, we analyze the application code, and insert only the minimal code required at specific points, creating a very compact and minimal infrastructure targeted at the individual application. Because we are working at a higher level of abstraction, we are able to make better decisions, since more task-related information is available during the code generation phase. The context switching is more efficient, saving only the variables that are live at the context-switch point. Custom structures are generated for each task, according to the execution behavior of them. The compiler is able to do a better job in optimizing the code because (i) all the code is available at compile time and (ii) task information is preserved in compilation.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35USC 112 are to be accorded full statutory equivalents under 35 USC 112. The invention can be better visualized by turning now to the following drawings wherein like elements are referenced by like numerals.

BRIEF DESCRIPTION OF THE DRAWINGS

FIG. 13$a$ is a partitioning diagram of the code of FIG. 13$b$ in which a loop is contained entirely within an AEB.

Figure 1:
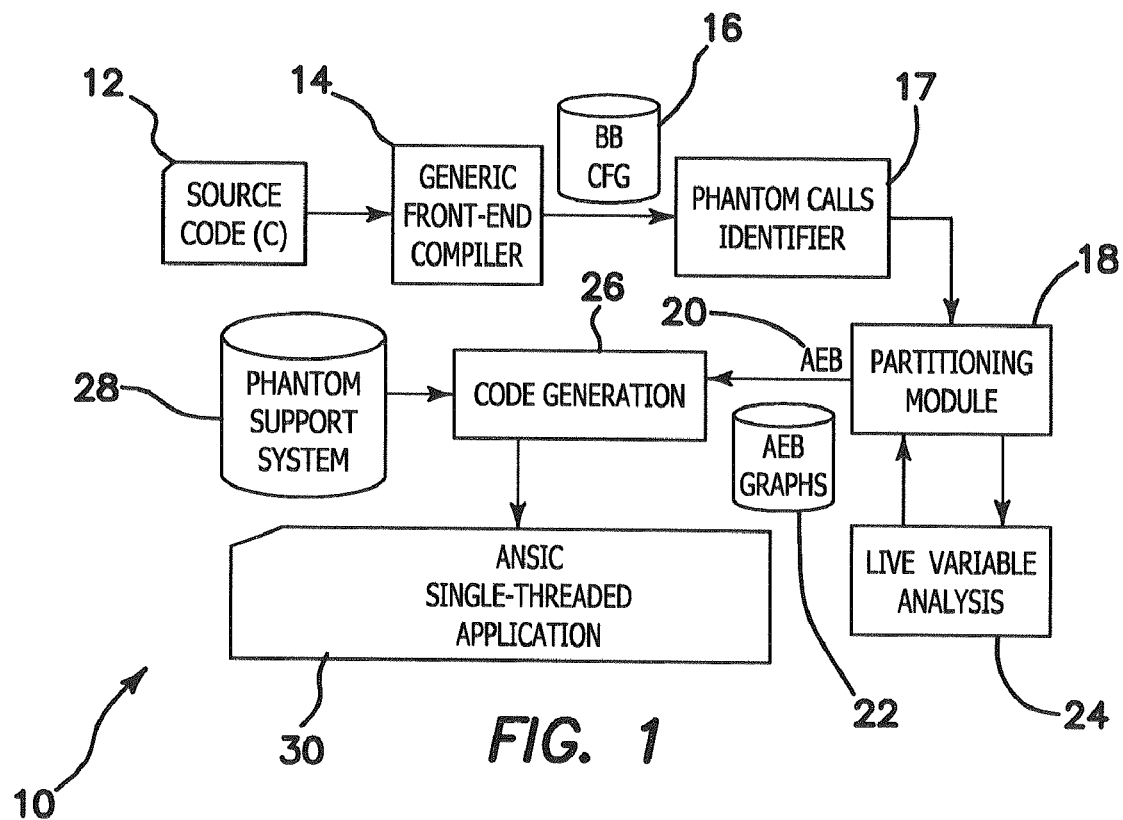
FIG. 1 is a diagram of the phantom serializing compiler of the illustrated embodiment.

The invention and its various embodiments can now be better understood by turning to the following detailed description of the preferred embodiments which are presented as illustrated examples of the invention defined in the claims. It is expressly understood that the invention as defined by the claims may be brOader than the illustrated embodiments described below.

DETAILED DESCRIPTION OF THE PREFERRED EMBODIMENTS

The illustrated embodiment of the invention is used during the development of embedded systems software. The designer specifies a multitasking code for the application, and the tool translates the code into a single-threaded code that can be executed in any processor without the need of any external libraries or extra system support. It can replace the use of a generic Operating System layer providing support for multitasking execution. An API is used by the programmer to specify task creation, synchronization, and communication. The API partially supports the POSIX interface. In the illustrated embodiment, the input is ANSI C compliant, extended only with POSIX. The output is an ANSI C, single threaded code, with no POSIX calls. The output is functionally equivalent to the input. The output can be compiled with any C compiler to generate code for any embedded processor or platform.

POSIX is an acronym for "portable operating system interface for UNIX", a set of IEEE and ISO standards that define an interface between programs and operating systems. By designing their programs to conform to POSIX, developers have some assurance that their software can be easily ported to POSIX-compliant operating systems. This includes most varieties of UNIX. The POSIX standards are now maintained by an arm of the IEEE called the Portable Applications Standards Committee (PASC).

Input to our translator is a multitasking program $P_{input}$, written in C: The multitasking is supported through the native phantom API, which complies with the standard POSIX interface. These primitives provide functions for task creation and management (e.g., task create, task join, etc.) as well as a set of synchronization variables (e.g., mutex t, sema t, etc.). Output of our system is a single-threaded strict ANSI C program $P_{output}$ that is equivalent in function to $P_{input}$. More specifically, $P_{output}$ does not require any OS support and can be compiled by any ANSI C compiler into a self-sufficient binary for a target embedded processor.

In order to support multitasking, there is a need for efficient sharing of the processor among multiple tasks, providing synchronization mechanisms, and communication primitives. Sharing of the processor among tasks requires preemption and, in turn, preemption requires a mechanism for saving/restoring task specific information (i.e., the task context). In conventional approaches, multitasking is implemented within the OS. When a task Ti is created, the OS allocates sufficient memory for saving Ti's context information (e.g., registers, function call stack, program counter, etc.). Periodically, an interrupt generated by the system timer invokes, among other things, the OS scheduler. The scheduler saves the context of the currently executing task $T_{old}$ and restores the context of a new task $T_{new}$ to be executed. The OS, in turn, relies on the underlying processor for invoking the scheduler (i.e., via a timer interrupt), context switching (register load/store instructions), and synchronization (i.e., test-and-set instruction).

In the illustrated embodiment, the challenge is to achieve the same at a higher level of abstraction, namely, by using the mechanisms provided by strict ANSI C language. FIG. 1 is the block diagram of the phantom compiler, generally denoted by reference numeral 10. The multitask C application 12 is compiled with a generic front-end compiler 14 to obtain the basic block (BB) control flow graph (CFG) representation 16. This intermediate BB representation 16 is annotated, identifying phantom primitives by a phantom calls identifier 17. The resulting structure is used by a partitioning module 18 to generate non-preemptive blocks of code, which we call atomic execution blocks 20 (AEBs), to be executed by the scheduler. An AEB 20 is a block of code that is executed in its entirety prior to scheduling the next AEB 20. The code blocks are "atomic" in the sense that their execution is not split up. Every task in the original code is potentially partitioned into many AEBs 20, generating an AEB graph 22. Then, a live variable analysis is performed by live variable analyzer 24 on the AEB graphs 22 and the result is fed back to the partitioning module 18 to refine the partitions until acceptable preemption, timing, and latency are achieved. The resulting AEB graphs 22 are then passed to the code generator 26 to output the corresponding ANSI C code for each AEB node 20. In addition, the embedded scheduler along with other C data structures and synchronization APIs from phantom 10 are included from the phantom system support library 28, resulting in the final ANSI C single-threaded code 30.

Next, consider the major components of phantom system 10, and the implementation details for the source level multitasking framework. The example of Table 1 is discussed. The example implements a simple game between two tasks that are picking up random numbers until one of them picks its own id, making it the winner of the game.

TABLE 1

```
typedef struct {                          int main(int argc, char **argv) {
  int id;                                   pthread_t t1, t2;
  pthread_mutex_t *lock;                    int r;
  pthread_mutex_t *unlock;                  struct game_t g1, g2;
}game_t;                                    pthread_mutex_t m1, m2;
int winner;                                 pthread_mutex_init(&m1, NULL);
void *game(void *arg) ( /* THREAD */        pthread_mutex_lock(&m1);
  game_t g = (game_t *)arg;                 pthread_mutex_init(&m2, NULL);
  int num;                                  pthread_mutex_lock(&m2);
  while(1) {                                g1.id = 1;
    pthread_mutex_lock(g->lock);            g2.id = 2;
    if(winner) {                            g1.lock = g2.unlock = &m1;
      pthread_mutex_unlock(g->unlock);      g2.lock = g1.unlock = &m2;
      return NULL;                          winner = 0;
    }                                       pthread_create(&t1, NULL, game, &g1);
    else {                                  pthread_create(&t2, NULL, game, &g2);
      num = rand( );                        pthread_mutex_unlock(&m1);
      if(num == g->id)                      pthread_join(t1, NULL);
        winner = g->id;                     pthread_join(t2, NULL);
      pthread_mutex_unlock(g->unlock);      printf("Winner is %d\n", winner);
    }                                     }
  }
}
```

Consider first task of preemption and scheduling. Since the output of phantom 10 is a single-threaded program 30, the first problem faced is how to simulate a multitasking system with a single-threaded code, using ANSI C resources. In order to schedule the different tasks, we need to define a context switching mechanism and a basic unit of execution. As mentioned earlier, we define the basic unit of execution, scheduled by the embedded scheduler in the single-threaded application 30, an atomic execution block (AEB) 20. A task Ti is partitioned into an AEB graph 22 whose nodes are AEBs 20 and whose edges represent control flow. An edge of an AEB graph 22 is defined as the entry and exit points to a group or region of code.

Figures 2A, 2B, 2C:
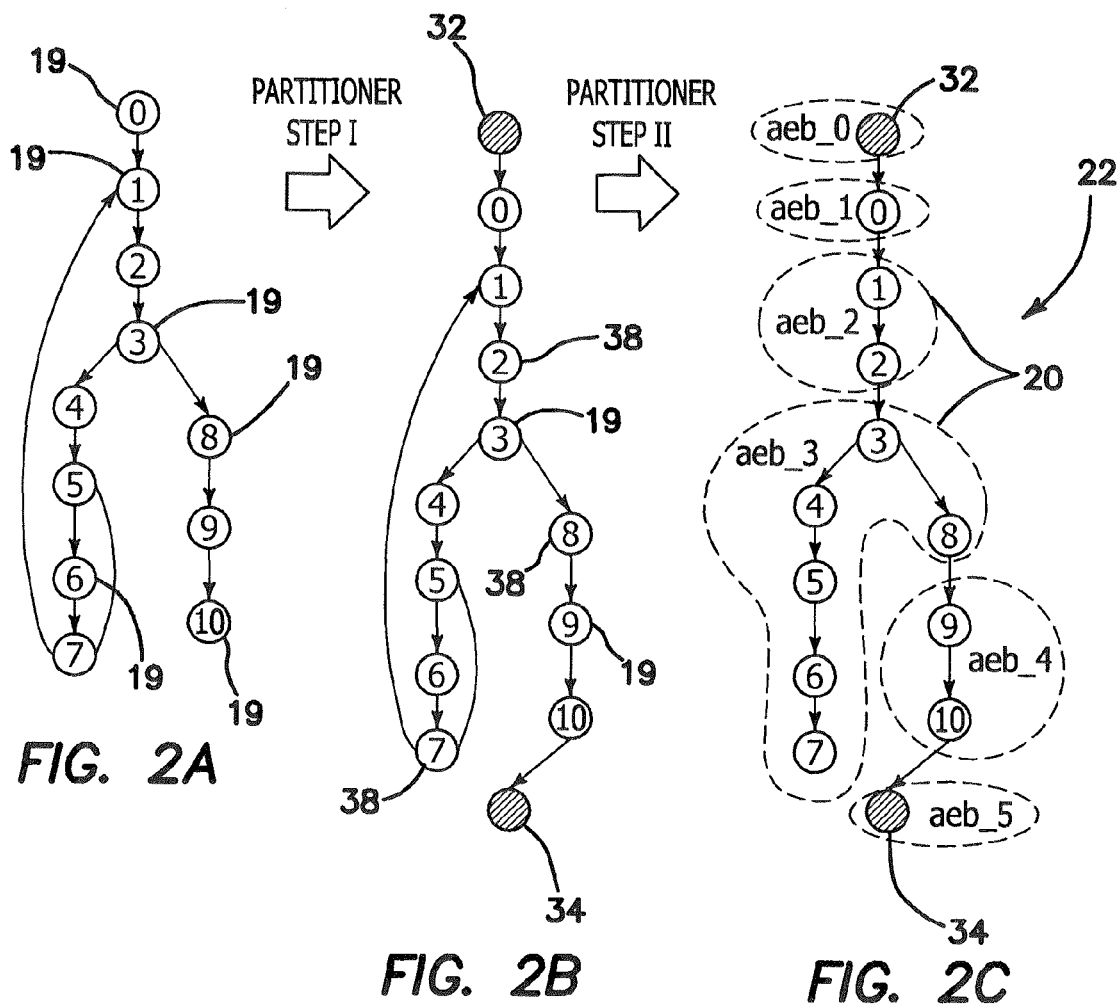
FIGS. 2a-2c are graphs which diagrammatically depict the CFG transformations for the function, game, of Table 1.

For example, FIGS. 2a-2c diagrammatically depict the CFG transformations for the function, game, of Table 1. FIG. 2a shows the output of the compiler front end 14 that is fed to the partitioning module 18. The partitioning module 18 adds two control basic blocks, setup 32 and cleanup 34, to the basic blocks of code 19 as shown in FIG. 2b, and subsequently divides the code into a number of AEBs 20, as shown in FIG. 2c.

FIG. 2c shows the AEB graph 22 of the function, game, as being composed of AEBs 20: aeb 0, aeb 1, aeb 2, aeb 3, aeb 4 and aeb 5. Within an AEB graph 22, the setup basic block 32 is implemented as a function, with the appropriate parameters derived from the original function in the multitasking C source 12. All the other AEBs 20 are implemented as a region of code, composed of one or more basic blocks 19, with a corresponding entry label. For instance, aeb 3 implementation is shown in Table 2 below (label game aeb3).

TABLE 2

```
typedef struct {                    static void scheduler( ) {                game_aeb2: {
  int          id;                    while(queue_size(&tasks) > 0) {           // restore locals from frame
  status_t     status;              sched:                                      game_t g = frame->g;
  task_info_t  info;                  if(current->status == RUNNABLE)           if(l){
  stack_t      frames;                  queue_push(&tasks, current);              current->next_aeb = 1;
  join_info_t  join_info;             current = queue_pop(&tasks);                pthread_mutex_lock(g->lock);
  aeb_t        next_aeb;              if(current->next_aeb != 0) }             }
  void         *ret;                  switch(current->next_aeb ) {              goto sched;
}context_t;                             case 1: goto game_aeb3;               }
char *game(void *arg, void **ret_val){  case 2: goto game_aeb2;               game_aeb3: {
  // allocate and setup frame            case 3: goto game_aeb5;                int num;
  frame = push(...);                     case 4: ......                         // restore locals from frame
  frame->arg = arg;                      .....                                  game_t g = frame->g;;
  // save the ret_val in the frame     }                                        if(!winner) goto bb_4;
  frame->ret = ret_val;              }                                          current->next_aeb = 7;
  // setup next aeb                  game_aeb5: {                               pthread_mutex_unlock(g->unlock);
  current->next_aeb = 1;               // clean up frame structure              goto exit;
  return frame;                        frame = pop(current->frames);          bb_4:
}                                      free(frame);                             num = rand( );
context_t *current;                    goto sched                               if(num != g->id) goto bb_7;
static pqueue_t tasks;             }                                            winner = g->id;
                                                                              bb_7:
                                                                                current->next_aeb = 2;
                                                                                pthread_mutex_unlock(g->unlock);
                                                                              exit:
                                                                                goto sched;
                                                                              }
```

The termination of an AEB region 20 transfers the control back to the embedded scheduler (Table 2, label sched). The scheduler, then, has a chance to activate the next AEB 20, from either the same task or from another task that is ready to run. A detailed description of the code layout and the scheduler implementation is described below.

It may happen that a function f in the original input code is phantomized (i.e., partitioned) into more than one AEB 20, each one of them being implemented as a separate region of code. In that case, there is a need for a mechanism to save the variables that are live on transition from one AEB 20 to the other, so that the transfer of one AEB 20 to another is transparent to the task. Also, every task must maintain its own copy of local variables during the execution of f as part of its context. Phantom 10 solves this issue by storing the values of local variables of f in a structure inside the task context, emulating the concept of a function frame. The frame of a phantomized or partitioned function f is created in a special function called fsetup 32, and cleaned up in the last AEB 20 of f in fcleanup 34. These operations are included by the partitioner 18 for every function that needs to be phantomized or partitioned. They are represented by the dark nodes 32, 34 in FIG. 2b. For an example of the generated ANSI C code, refer to Table 2, function, game, for fsetup 32, and label game aeb5, for fcleanup 34.

During runtime, there is a need to maintain, among others, a reference to the next AEB node 20 that is to be executed some time in the future, called next-aeb, in the context information for each task that has been created (Table 2, structure context t). When a task is created, the context is allocated, the next-aeb field is initialized to the entry AEB 20 of the task, and the task context is pushed onto a queue of existing tasks, called tasks, to be processed by the embedded scheduler.

We note that in the phantom implementation, the partitioning is performed on the basic block intermediate representation 16 of the input source program. In that sense, almost no high level code constructs, like while, for loops, and switch statements are preserved in the equivalent ANSI C output (see Table 2, label game aeb2). Moreover, we note that an AEB node 20 may be composed of one or more basic blocks 19. Code partitioning and its implications on runtime behavior are described below.

The embedded scheduler is responsible for selecting and executing the next task, by activating the corresponding AEB 20 of the task to be executed. The next-aeb reference of a task Ti is used to resume the execution of Ti by jumping to the region of code corresponding to the next AEB 20 of Ti. At termination, every AEB 20 updates the next-aeb of the currently running task to refer to the successor AEB 20 according to the tasks' AEB graph 22. A zeroed next-aeb indicates that Ti has reached its termination point, and thus is removed from the queue of existing tasks.

The scheduling algorithm in phantom 10 is a priority based scheme, as defined by POSIX. The way priorities are assigned to tasks, as they are created, can enforce alternate scheduling schemes, such as round-robin, in the case of all tasks having equal priority, or earliest deadline first (EDF), in the case of tasks having priority equal to the inverse of their deadline, priority inversion, and so on. Additionally, priorities can also be changed at run-time, so that scheduling algorithms based on dynamic priorities can be implemented.

Consider now synchronization. Phantom 10 implements the basic semaphore (sema t in POSIX) synchronization primitive, upon which any other synchronization construct can be built. In multitasking systems, a semaphore is a variable with a value that indicates the status of a common resource. It's used to lock the resource that is being used. A process needing the resource checks the semaphore to determine the resource's status and then decides how to proceed. A semaphore is an integer variable with two operations, wait and signal (sema wait and sema post in POSIX). A task Ti calling wait on a semaphore S will be blocked if the S's integer value is zero. Otherwise, S's integer value is decremented and Ti is allowed to continue. Ti calling signal on S will increment S's integer value and unblock one task that is currently blocked waiting on S. To implement semaphores, there is a need to add to a task Ti's context an additional field called status. Status is either "blocked" or "runnable" and is set appropriately when a task is blocked waiting on a semaphore.

A semaphore operation, as well as a task creation and joining, is what is called a synchronization point. Synchronization points are identified by the shaded nodes 38 in FIGS. 2a-2c. At every synchronization point 38 a modification in the state of at least one task in the system might happen. Either the current task is blocked, if a semaphore is not available, or a higher priority task is released on a semaphore signal, for example. Therefore, a function is always phantomized when synchronization points 38 are encountered, and a call to a synchronization function is always the last statement in its AEB 20. At this point, the embedded scheduler must regain control and remove the current task from execution in case it became blocked or is preempted by a higher priority task.

Right before any synchronization, an AEB 20 will set the task's next-aeb to the successor AEB 20 according to the AEB graph 22. If the task is not blocked at the synchronization 38, it will continue and the next-aeb will be executed next. Otherwise, the next-aeb will be postponed, and it will be executed as soon as the task is released on the synchronization point 38.

Turn now to Interrupts. Preempting an AEB 20 when an interrupt occurs would break the principle that every AEB 20 executes until completion without preemption. Instead, in phantom 10, the code for an interrupt service routine, I, is treated as a task, with its associated AEBs 20. On an interrupt destined for I, a corresponding task is created, having a priority higher than all existing tasks. Note that if multiple interrupts destined for 1 occur, multiple tasks will be created and scheduled for execution. This is a uniform and powerful mechanism for handling interrupts in a multitasking environment. However, the latency for handling the interrupt will depend on the average execution time of the AEBs 20, which in turn depends on the partitioning scheme used. Some interrupts may need architecture specific code, like those associated with some device drivers. Architecture specific constructs in the original code are preserved by the phantom serializing compiler 10, and copied verbatim to the output.

Consider now partitioning. The partitioning of the code into AEB graphs 22 is the key to implementing multitasking at a high-level of abstraction. Recall that boundaries of AEB 20 represent the points where tasks might be preempted or resumed for execution. Some partitions are unavoidable and must be performed for correctness, specifically, when a task invokes a synchronization operation, or when a task creates another task. In the case when a task invokes a synchronization operation and thus is blocked, the embedded scheduler must regain and transfer control to one of the runnable tasks. Likewise, when a task creates another, possibly higher priority task, the embedded scheduler must regain and possibly transfer control to the new task in accordance with the priority based scheduling scheme. Additionally, the programmer can also manually specify points in the code where a context switch should happen by calling the yield function of the phantom API.

Any original multitasking C program is composed of a set of functions or routines. In phantom 10, and for correctness, all functions that are the entry point of a task need to be partitioned. In addition, and for correctness, any function that invokes a synchronization primitive also needs to be partitioned. We define the process of partitioning functions into AEBs 20 as "phantomization". Finally, and for correctness, a function that calls a phantomized function also needs to be phantomized. To illustrate why this is, consider f calling a phantomized function g. Upon termination of g, the scheduler must transfer control back to f. Since transfer of control in phantom 10 is achieved through a branch in the embedded scheduler, f must at least be decomposed into two blocks, f1 and f2. Moreover, f1's last instruction will be the instruction that transferred control to g, and f2's first instruction will be the one immediately following the call to g. However, partitioning beyond what is needed for correctness impacts timing issues as described next.

In general, partitioning will determine the granularity level of the scheduling (i.e., the time quantum), as well as the task latency. A good partitioning of the tasks into AEBs 20 would be one where all AEBs 20 have approximately the same average case execution time μ and a relatively low deviation δ from the average, which can be computed if the average case execution time of each AEB 20 is known. In this situation, the application would have a very predictable and stable behavior in terms of timing. Note that the average case execution time W, of an AEB 20 Ni is defined as the time taken to execute the code $C_i$ in $N_i$ plus the time taken to store and restore all live variables $V_i$ at the entry and exit of $N_i$. Moreover, an estimate of $V_i$ can be obtained by performing a live variable analysis. An estimate of the execution time of $C_i$ can be obtained by static profiling.

The range of partitioning granularities is marked by two scenarios. On one end of the spectrum, partitioning is performed only for correctness, and yields cooperative multitasking. On the other end of the spectrum, every basic block 19 is placed in its own partition, resulting in preemptive multitasking with extremely low latency, but high overhead. Specifically; to evaluate a partition we can apply the following metrics: average, minimum, and maximum latency; standard deviation of latency; and/or context switch overhead. Clearly, to shorten latency, there is a need to context switch more often, and thus pay a penalty in terms of overhead.

Consider the range of partitioning possibilities, defining a strategy for clustering, and an exploration framework for obtaining a set of pareto-optimal partitions. A pareto-optimal partition is one in which there is no other partition which would more preferable.

First turn to the strategy for clustering. The generic clustering algorithm used to group basic blocks 19 into partitions that correspond to AEBs 20 is based on two algorithms traditionally used for data flow analysis by compilers, namely interval partitioning and interval graphs. Cooperative multitasking is when tasks explicitly yield to each other or are preempted by a synchronization primitive. The generic clustering algorithm takes as input a CFG 22, and returns a set of disjoint clusters, each cluster grouping one or more of the basic blocks 19 of the original CFG 22. The generic clustering algorithm ensures that a cluster of basic blocks 19 has a single entry point (i.e., the head of the cluster), but possibly multiple exit points. This requirement is necessary since every cluster is implemented as a non-preemptive block of code, with one single entry. The generic clustering technique of the illustrated embodiment is shown in Table 3.

TABLE 3

Input: cfg, $n_0 \in$ cfg the entry point of the CFG
Output: clusters $c_1, c_2,...,c_n$
   clust $\leftarrow \{c_i \leftarrow b_i | b_i \in$ cfg and reachable from $n_0\}$
   changed $\leftarrow 1$
   while changed = 1
     changed $\leftarrow 0$
     for each $c_i, c_j \in$ clust TABLE 3-continued if every pred. of $c_j$ is in $c_i$
         $c_{new} \leftarrow c_i \cup c_j$
         clust $\leftarrow$ (clust $- c_i - c_j) \cup \{c_{new}\}$
         changed $\leftarrow 1$
       endif
     endfor
   endwhile Initially, for a given CFG 22 and its entry basic block $n_0$, a set of clusters is computed, each containing one (reachable from $n_0$) basic block 19 of the CFG 22 (line 3). Subsequently, pairs of clusters $c_i, c_j$ are merged if all of $c_j$'s predecessors are in cluster $c_i$. The predecessors of $c_j$ are all clusters containing one or more basic block(s) 19 that are predecessor(s) of at least one basic block 19 in $c_j$. The algorithm iterates until no more clusters can be merged.

Note that if the algorithm described in Table 3 were to run on a CFG 22, it would cluster all the basic blocks 19 into a single partition, as expected. Therefore, we introduce a mechanism to modify the input CFG such that, using the same algorithm, we obtain a desired partitioning for correctness and timing. The mechanism is to modify the original CFG 22 with two special empty basic blocks 19, synch-mark and time-mark. Neither of these marker basic blocks 19 are reachable from the entry basic block $n_0$, and are, for that reason, not a member of a cluster (line 3). All points of partitioning that are required for correctness or timing will be pointed to by one of these markers prior to running the algorithm shown in Table 3.

Figures 3A, 3B, 3C, 3D, 3E, 3F:
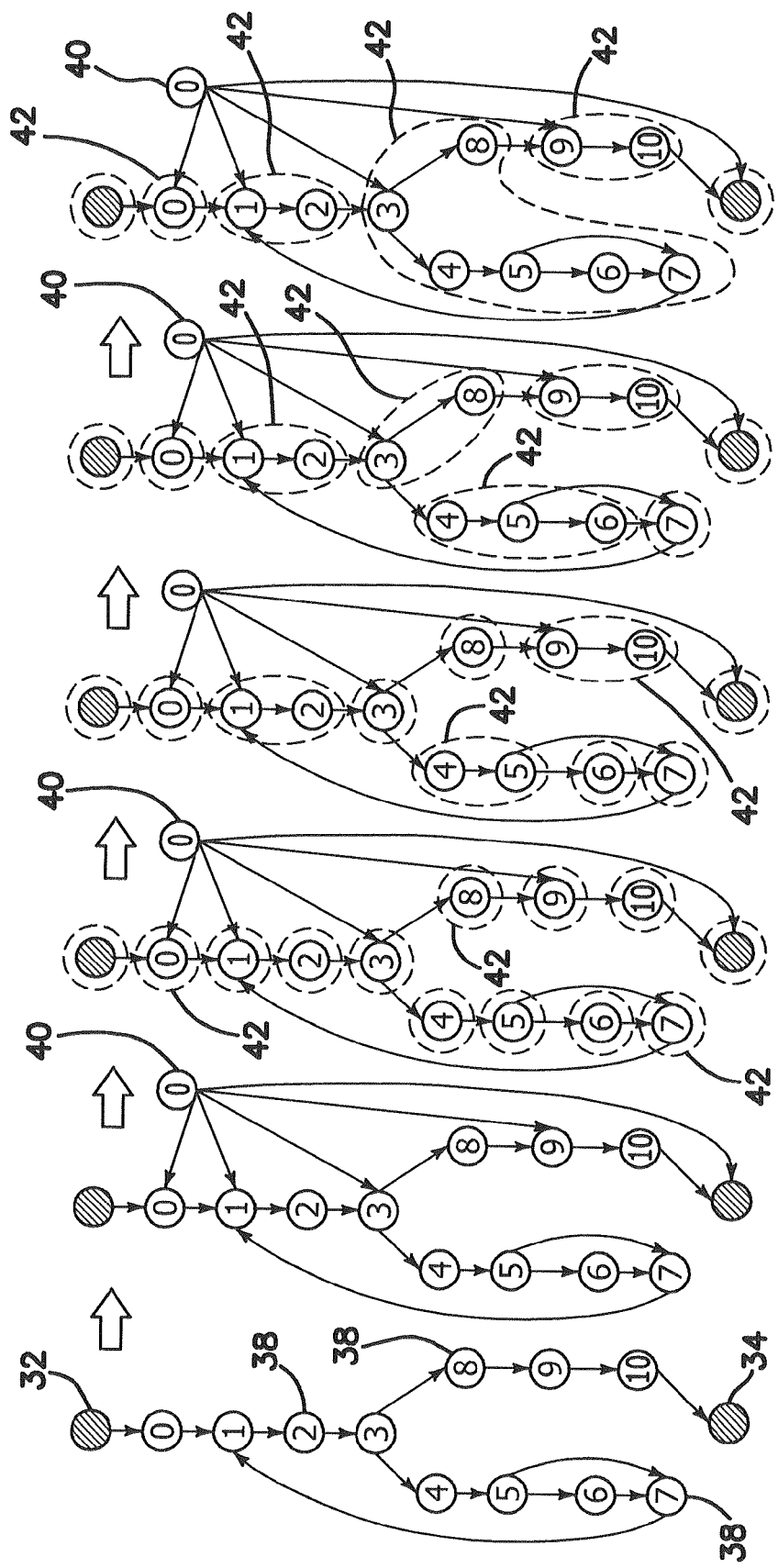
FIGS. 3a-3f are CFG graphs which show, step-by-step, the working of a clustering algorithm for the function, game, of Table 1.

FIGS. 3a-3f show, step-by-step, the working of the clustering algorithm. FIG. 3a is the CFG 22 for the function, game, augmented with the setup basic blocks 32 and cleanup basic blocks 34, where gray nodes represent those basic blocks with a synchronization point 38. FIG. 3b shows the addition of the synch-mark (s) basic block 40. Next, every reachable basic block 19, $b_i$, of the sample CFG 22 is assigned to cluster ($c_i$) 42 as shown in FIG. 3c. Then, by successive iterations, clusters are merged until the final partitioning is reached, as shown in FIGS. 3c-3f. The introduction of the synch-mark block 40 is taken care of by the phantom compiler 10.

In summary, generic clustering comprises modifying the original control flow graph CFG to add extra precedence nodes to nodes that contain identified synchronization points and to nodes that are manually programmed specific points. The generic clustering comprises assigning each node of the control flow graph CFG to its own cluster, and later merging the clusters according to precedence/dependence relationship between nodes in the control flow graph CFG. Merging the clusters comprises merging two clusters if all their predecessors are in the same cluster. Generic clustering comprises merging the clusters until all predecessors are considered in the merging process, which stops when no more merging is possible.

The introduction of the time-mark is performed by the exploration framework described below. In other words, the exploration of the different partitions and the search for the pareto-optimal set of partitions is a matter of determining the set of basic blocks 19 to which the time-mark points.

Consider now the problem of partitioning loops in code. Each scheme partitions the application in different places, resulting in different timing behavior, AEB sizes, number of context switches and so on. It is desirable to obtain the partition that meets the required constraints while, at the same time, minimizes the multitasking overhead imposed on the application. For AEBs 20 with a straight sequence of code, i.e., no loops, this is not difficult to do. If an AEB, aebi, is too large, i.e., its execution time does not meet the timing constraints, it is always possible to partition aebi into aebi1 and aebi2, therefore reducing the size of the original aebi. Here, there is an increase by one in the number of context switches on every execution of aebi, which is acceptable to meet the timing constraints.

Partitioning an AEB 20 with loops, however, is not as trivial. Assume the sample code segment for a task shown in Table 3a below, which contains a loop (lines 8-10) that executes an undetermined number of times.

TABLE 3a

```
1  void task( ) {
2
3  int a, b;
4
5  a=10;
6  b=0;
7
8  while(a>b) {
9       b=rand( );
10      print(b);
11 }
12 print(a);
13 ...
}
```

Figures 14A, 14B:
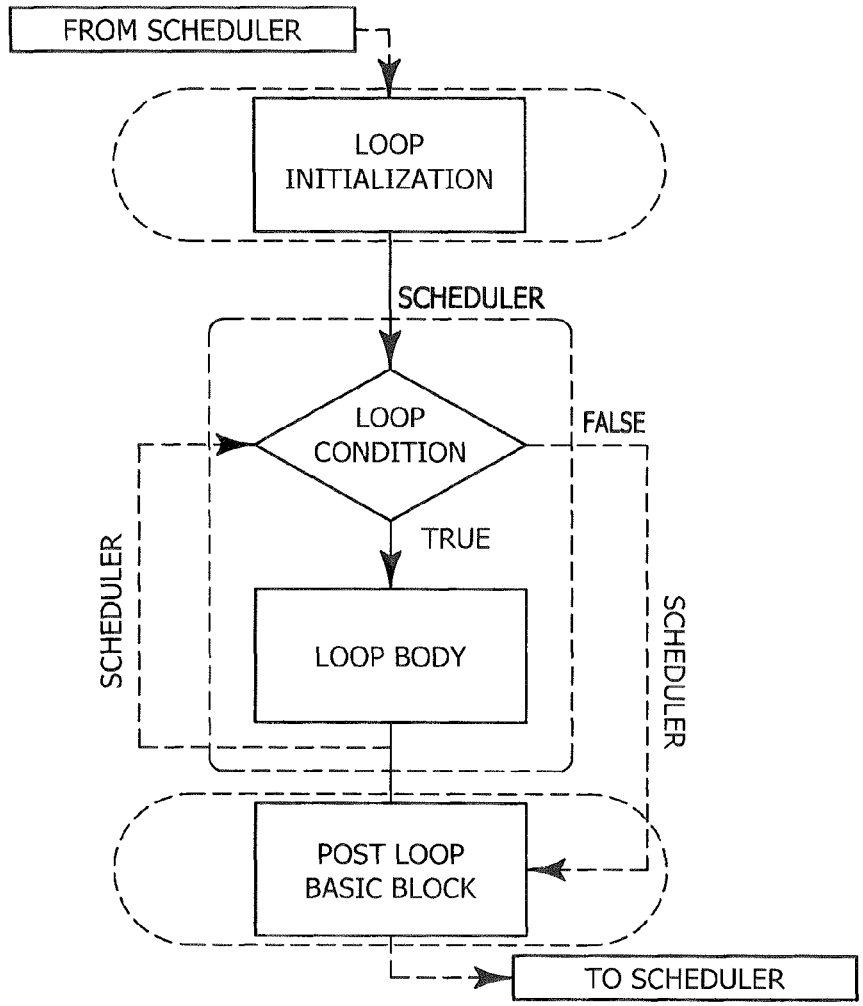
FIG. 14$a$ is a partitioning diagram of the code of FIG. 14$b$ in which a loop back-edge to be logically executed by the scheduler is separated, forcing a context switch at every loop iteration.
Figures 15A, 15B:
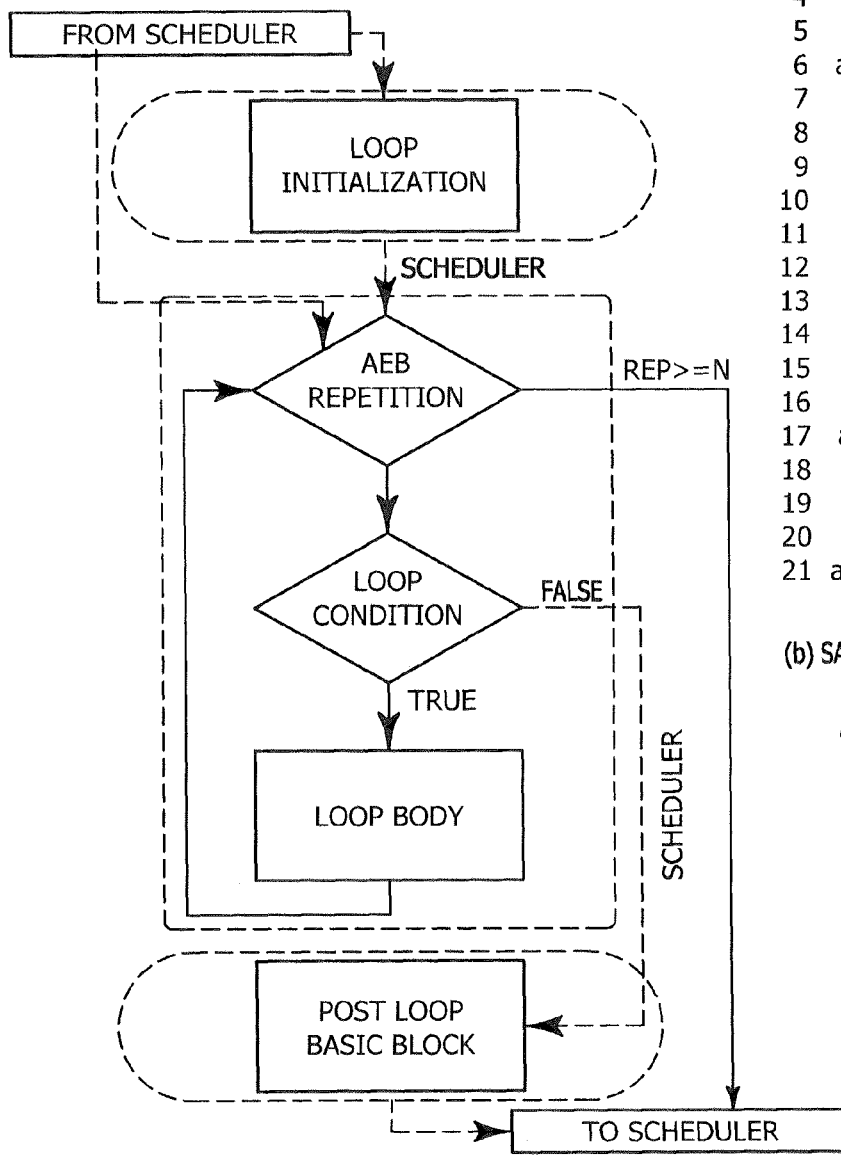
FIG. 15$a$ is a partitioning diagram of the code of FIG. 15$b$ in which the loop body is enclosed within an external for loop, which repeats the AEB execution N times before preempting the loop and returning to the scheduler.

In general, three repartitioning schemes are possible. Firstly, the loop can be entirely contained inside the AEB 20, including loop body and control into the same AEB 20. This is shown in FIGS. 13a and 13b. Alternatively, the partitioner can separate the loop back-edge to be (logically) executed by the scheduler, forcing a context switch at every loop iteration, as illustrated in FIGS. 14a and 14b. Finally, the partitioner is able to organize the loop body and back-edge into the same AEB 20, adding extra control instructions to allow a context switch during the loop execution as illustrated in FIGS. 15a and 15b. AEBs 20 that contain loops, as in FIGS. 13a and 13b, can execute for a long time, namely until b is randomly assigned a value larger than a in the case of the example in Table 3a. While the AEB 20 executes, all other tasks are waiting, as is the scheduler. Therefore, events cannot be checked, and timely execution of other tasks is not guaranteed. Nevertheless, the multitasking overhead is small, since the scheduler is activated only after the AEB 20 and consequently the loop completes.

The separation of the loop back-edge, enforcing a context switch at every iteration, reduces the response time of the application. Note that the loop condition at line 7 in FIG. 14b is checked on every loop iteration. Also note that once the loop body (lines 8-9) is executed, the AEB 20 returns to the scheduler (line 10) without modifying the next-aeb of the current task. Therefore, when the task regains the processor, aeb2 will be executed again, effectively traversing the loop back-edge via the scheduler. With such scheme, the time between scheduler invocations is likely smaller than the timing constraints. However, the overhead imposed by such invocations is large, especially if the loop iterates many times, each of them executing a short loop body. This is a common scenario in many applications.

It is possible for the loop body to iterate a number N of times before being preempted by the scheduler, while meeting the timing constraints and not increasing the multitasking overhead excessively. This is the solution pictured in FIGS. 15a and 15b. The loop body is enclosed within an external FOR loop, which repeats the AEB execution N times before preempting the loop and returning to the scheduler. Later, the scheduler activates the task again, the loop body is resumed and allowed to execute another N times, if necessary.

Using the approach depicted in FIGS. 15a and 15b, it is possible to control the execution time of an AEB 20 more precisely, with a finer granularity. With such partition, there is a balance between multitasking overhead and timely execution of tasks. In order to implement it, one needs to determine the value of N, representing the number of consecutive loop iterations of the AEB 20 before it is preempted. The execution time of a loop body can vary between iterations, and it is not usually possible to have all iterations to execute for exactly the same time. The value of N can be computed from an average execution time of the loop body, in case of soft time constraints. If worst case timing guarantees are necessary, such as in a hard real time system, the value of N is determined by the worst case execution time (WCET) of the loop body.

Figure 4:
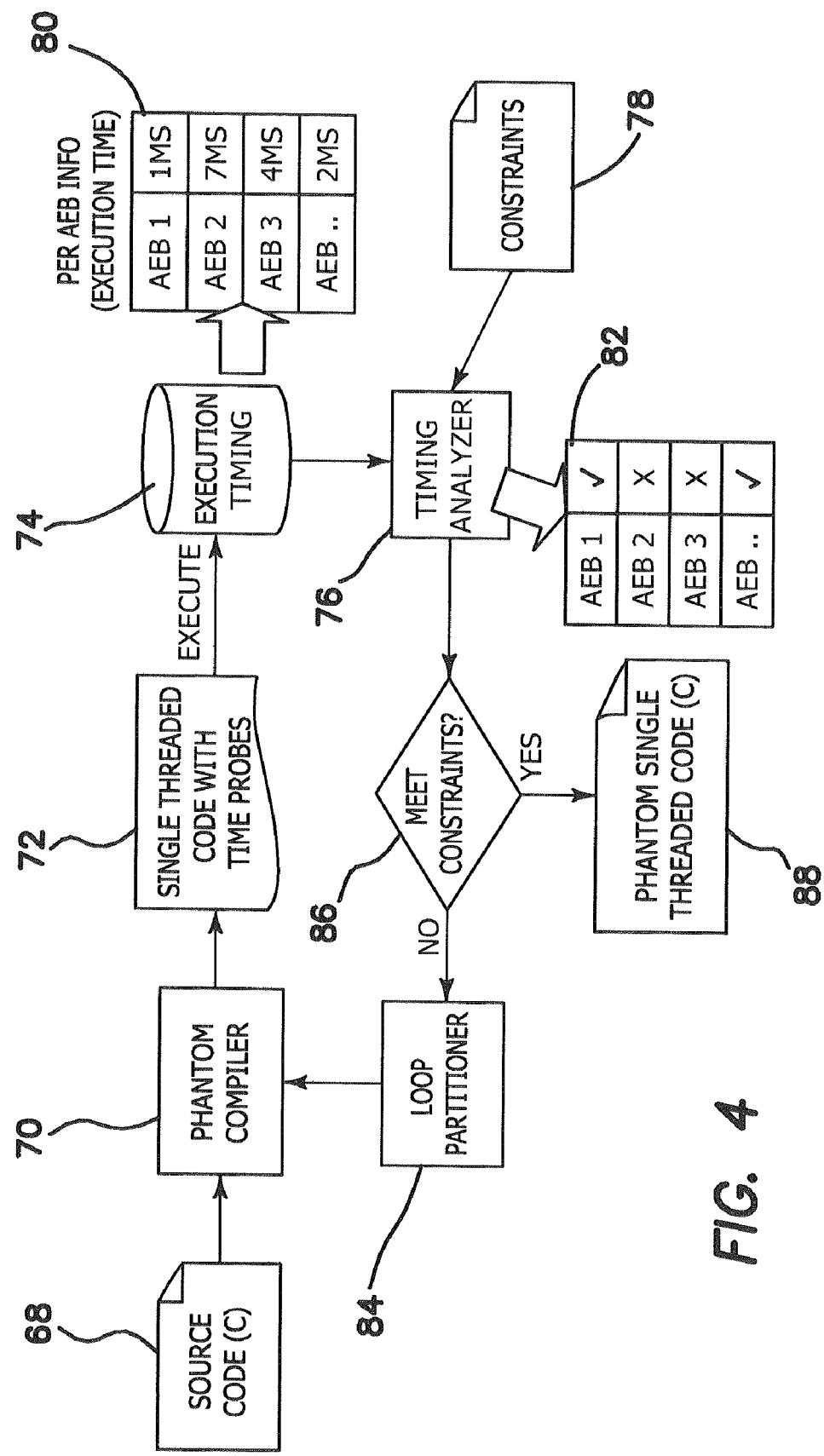
FIG. 4 is an overall block diagram of the exploration framework.

Consider the exploration framework which generates a pareto optimal partition illustrated in FIG. 4. The synthesis of code that adheres to specified timing constraints, such as maximum response time of a task, requires an analysis of the application code, and in case of the phantom compiler 10, appropriate partitioning. Because an AEB 20 executes atomically, i.e., there is no preemption during an AEB 20, reaching the right AEB size for all AEBs 20 is crucial to obtain the desired timing behavior of an application. Thus, consider the timing analysis framework developed to analyze AEBs 20 and to generate the appropriate code partition given a set of timing constraints. The timing analysis framework of the illustrated embodiment is shown in the flowchart-software architectural diagram of FIG. 4. The original C application at step 68, extended with POSIX, is compiled by phantom 10 and partitioned with the cooperative scheduling model, i.e., only the partitions mandatory for correct multithreading at step 70. The code generation process of phantom 10 instruments the code with timing probes at step 72, which will generate profiling information for each AEB 20 executed. The phantomized code is executed at step 74 and the generated profile is analyzed in the timing analyzer tool at step 80. The timing analyzer 76 checks at step 78 for the constraints specified by the application designer, and outputs a list of the AEBs 20 at step 82 that do not meet the timing constraints as symbolically indicated in FIG. 4 by a check mark as opposed to an "X". Each of those AEBs 20 which do not meet the timing constraints as determined at step 86 is processed by the loop partitioner 84, which searches for loops in the AEB 20 and appropriately partitions the AEB 20 into multiple AEBs 20 with modified, and correct, new versions of the loop.

The new partition is processed again by the phantom compiler at step 70, which synthesizes the corresponding C code for the new AEBs 20. The process is repeated until all the AEBs 20 meet the timing constraints. When all constraints are met, the phantom compiler 10 synthesizes the final version of the code, without the timing probes at step 88.

The loop partitioner stage 84 analyzes loops according to the algorithm in Table 4 below.

TABLE 4

Algorithm 1 The Loop Partitioning Algorithm

```
1:  Input: List of AEBs aeb_list, current partition P_n
2:  Output: New Partition P_{n+1}
3:  P_{n+1} ← P_n
4:  for each aeb_i ∈ aeb_list do
5:      if timing(aeb_i) meets constraints then
6:          if aeb_i has modified loops in P_n then
7:              N_i ← loop body repetitions for aeb_i
8:              save N_i in P_{n+1}
9:          end if
10:     else
11:         if aeb_i has loops then
12:             loop_i ← outmost loop with longest execution time
13:             loop_i.repetition ← 1
14:             new_aebs ← partition(loop_i)
15:             save new_aebs in P_{n+1}
```

TABLE 4-continued

Algorithm 1 The Loop Partitioning Algorithm

```
16:        else
17:            new_aebs ← split(aeb_i);
18:            save new_aebs in P_{n+1}
19:        end if
20:    end if
21: end for
```

The goal in the loop preemption algorithm is to determine which loops should be preempted while being executed, and when the preemption has to happen, so that timing constraints such as response time are met. When searching an AEB 20 for loops to be partitioned (lines 11-15 in Table 4a), the algorithm will select the outermost loop of an AEB 20 in case there are nested loops within one AEB 20 (line 12). Otherwise, if an inner loop is selected, all the enclosing outer loops will be partitioned, in addition to the selected loop. Therefore, multitasking overhead will be excessively increased. If the new partition still does not meet the constraints, the next nesting level will be analyzed, so the algorithm works inwards in the nested loop structure. Note that since we rely on profiling information for partitioning, the approach is not applicable to hard real-time applications. However, it is possible to replace the profiling method for a static analysis considering the WCET of each basic block, which would provide much stricter guarantees on the execution of the synthesized code.

Figure 5:
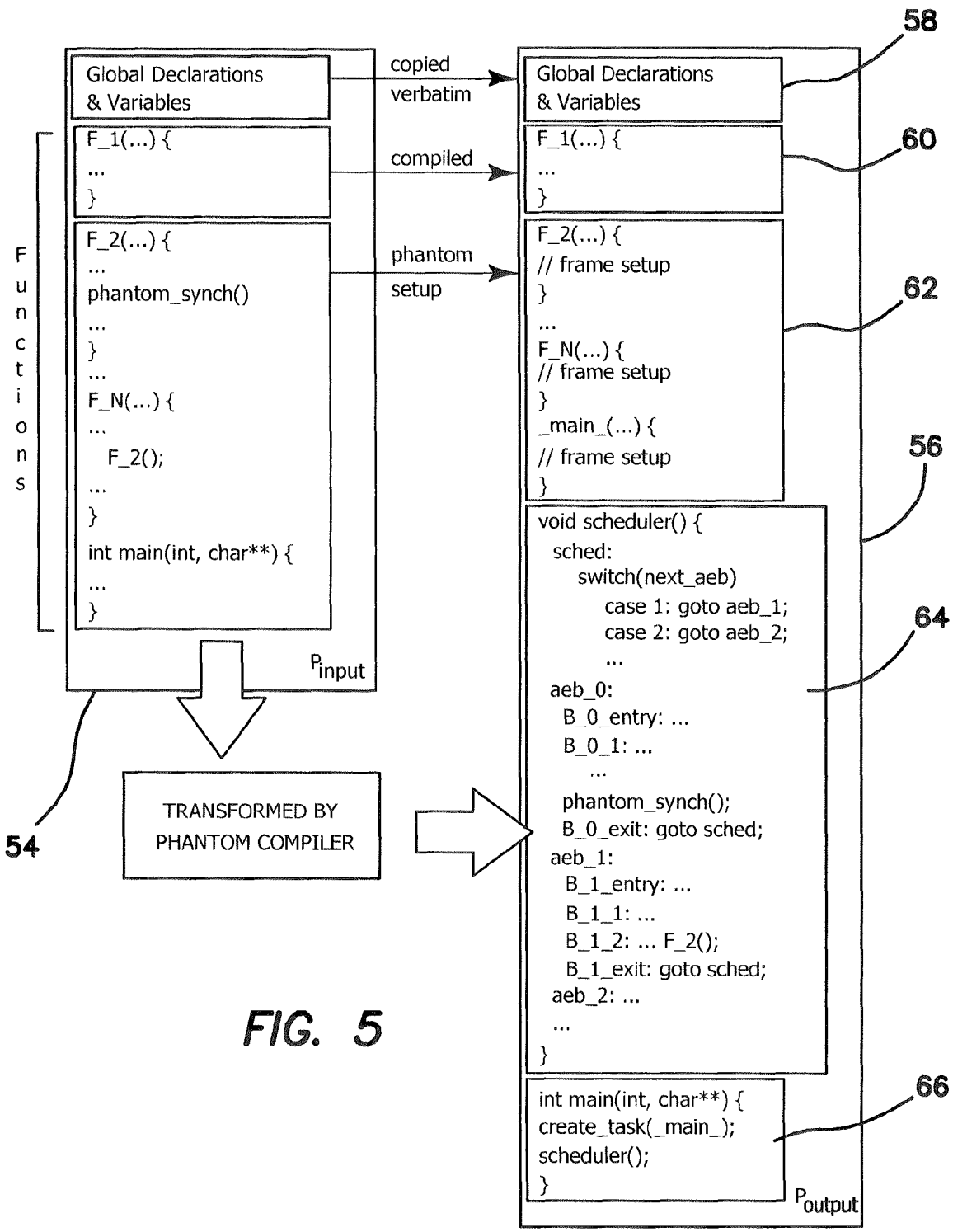
FIG. 5 is a diagram of the code layout of the input program $P_{input}$, processed by a C pre-processor.

Now consider the architecture of generated code. The code layout of the input program $P_{input}$, once processed by a C pre-processor, is conceptually organized in two sections, as shown in the left side of FIG. 5. The first section 54 contains all global declarations and variables, while the second section 56 contains a set of functions. One of these functions is the main function, i.e., the entry point of the application. The phantom output program $P_{output}$ is organized in five sections, as shown in right side of FIG. 5. The first section 58 contains global declarations and variables. The second section 60 contains a set of functions that are not phantomized. The third section 62 contains a set of functions, each corresponding to one phantomized function of $P_{input}$. The fourth section 64 contains a single function, called scheduler, which contains the code for all the phantomized functions, as well as the scheduling algorithm. Finally, the fifth section 66 contains the main function of $P_{output}$. We describe each of these sections in more detail below.

The first section 58 contains global declarations and variables, which are copied verbatim from $P_{input}$. All the functions of $P_{input}$ are analyzed and classified in two groups: the phantomized and non-phantomized functions. A function is phantomized if (i) it is the entry point of a task, (ii) contains a synchronization primitive(s), or (iii) calls a phantomized function. Note that, since main is the entry point of the first task that is created by default, it is automatically phantomized.

The second section 60 of $P_{output}$ contains all non phantomized routines, copied over from $P_{input}$. In the current implementation of phantom, non-phantomized functions are compiled into intermediate form by the front-end, and re-assembled into an equivalent low level C representation by the back-end. Thus, while functionally identical, the non-phantomized functions of $P_{output}$ lack the high level code constructs (e.g., loops) found originally in $P_{input}$.

The third section 62 contains the setup functions, each corresponding to a phantomized function of $P_{input}$. A setup function is responsible for allocating the frame structure of each phantomized function. The frame and task context memory layout is described below.

The next section 64 of $P_{output}$ contains the phantomized functions, along with the scheduler. All of these (i.e., the phantomized functions and scheduler) are embodied into a single C function of $P_{output}$, namely embedded scheduler. Recall that a phantomized function is partitioned into a set of AEBs 20, aeb0, aeb1, . . . , aebn. An AEB 20, aebi, is in turn composed of one or more basic blocks 19, (Bi,enter,Bi,2, Bi,3, . . . , Bi,exit). By definition, execution of AEB 20, aebi, starts at the entry basic block 19 of Bi,enter and ends at the exit basic block Bi,exit. The exit basic block Bi,exit of AEB 20, aebi, transfers control to a special basic block 19, sched, that serves as the entry point of the scheduling algorithm. The scheduler function contains all these basic blocks 19, starting with basic block 19, sched, in low-level C, using C labels to denote basic block boundaries and C goto statements as a branching mechanism. The scheduling algorithm is described in below.

Finally, the fifth section 66 of $P_{output}$ contains an implementation of the main function, which creates a single task, corresponding to the main entry point of $P_{input}$, and calls the embedded scheduler function to invoke the scheduling algorithm.

Turn now to the memory layout. As described above, each time a task is created, memory is allocated to store its context. At any given time, a special global variable, named current, is made to point to the context of the running task by the embedded scheduler. Moreover, a queue of running tasks, named tasks, is maintained, according the priorities of each task, by the embedded scheduler, as described below. The context of a task is further defined in Table 5.

TABLE 5

```
struct context_t {
    id          // an integer unique identifier
    status      // one of runnable or blocked
    priority    // one of possible priority levels
    next_aeb    // a reference to the next aeb to be executed
    stack       // an array based stack set aside for function frames
    waiting     // a reference to a task waiting to join this task
    ret_val     // memory to hold the exit value of this task
}
```

Most of the fields of this structure were discussed above. Here, we focus on the stack field of a context. The purpose of the stack is to store the task-local data of each phantomized function. Moreover, the choice of a stack is to allow for recursion and nested function calls. The collection of all this data for a phantomized function f is defined as "f's frame", and is structured as shown in Table 6.

TABLE 6

```
struct f_frame_t {
    arg_0       // first argument of phantomized function
    arg_1       // second argument of phantomized function
    ...
    arg_N       // last argument of phantomized function
    local_0     // live variable
    local_1     // live variable
    ...
    ret_aeb     // a reference to the next AEB of calling function
}
```

The frame of each phantomized function includes function arguments and local variables which are live at the boundary of its AEBs 20. The code in all basic blocks 19 of f's AEBs 20 access the most recent instance of fs frame.

The stack is managed by the setup functions and the cleanup AEBs 20 of phantomized functions. Specifically, when a function g of the current task calls a phantomized function f, the setup function fsetup is invoked. Then, fsetup pushes f's frame onto the stack of the current task, copies f's arguments to the frame, saves the return AEB 20 of the calling function g, and makes the current task's next AEB 20 point to the entry AEB 20 of f. The structure of the setup function is shown in Table 7.

TABLE 7

```
void f_setup(arg_0, ... , arg_N) {
    f_frame_t *frame
    frame = &current->stack.buffer[current.stack.free]
    current->stack.top = current->stack.free
    current->stack.free += sizeof(f_frame_t)
    frame->arg_0 = arg_0
    ...
    frame->arg_N = arg_N
    frame->ret_aeb = current->next_aeb
    current->next_aeb = f_aeb_0
}
```

Conversely, when a called function f completes its execution, the cleanup AEB 20, aebexit, of f performs as follows. First, it restores the current task's next AEB 20 to point to the next AEB 20 of the calling function g, which was stored in the frame of f by the f's setup function. Then, it pops the frame of the current task's stack, as shown in Table 8.

TABLE 8

```
f_aeb_exit: {
    f_frame_t *frame
    frame = &current->stack.buffer[current.stack.top]
    current->next_aeb = frame->ret_aeb
    current->stack.free = current->stack.top
    current->stack.top -= sizeof(f_frame_t)
}
```

Consider now the embedded scheduler. The scheduler's code is included in the same C function containing the phantomized functions, called scheduler. The scheduling algorithm makes use of a priority queue that stores all the runnable tasks. The priority queue guarantees that the highest priority task is always the first task in the queue. In case of a priority tie among two or more tasks, the scheduler implements a round-robin scheme among them, so that all equal-priority tasks fairly share the processor. When a task is selected by the scheduler for execution, the global current pointer is updated accordingly.

As stated earlier, each AEB 20 returns the execution to the scheduler upon termination. This is accomplished through a jump to the first basic block of the scheduler. Once the scheduler determines the next task Ti to be executed, it uses Ti's next aeb reference to transfer control back to the next AEB 20. The transfer of control from the scheduler to the next AEB 20 of the running task is implemented using a switch statement containing goto's to all AEB's 20 of the application. (This level of indirection is necessary because ANSI C does not allow for indirect jumps.) When the AEB 20 completes execution, control is returned to the scheduler, which then pushes the current task's context back to the queue of runnable tasks if the task is not blocked or terminated. An overview of the scheduler is depicted in Table 9.

TABLE 9

```
queue_t *tasks
context_t *current
void scheduler( ) {
    while(tasks->size > 0) {
        sched: {
            if(current->status == RUNNABLE)
                tasks->push(current)
```

TABLE 9-continued

```
            current = tasks->pop( )
            switch(current->next_aeb) {
                case 1: goto aeb_0
                case 2: goto aeb_1
                ...
            }
        }
    }
    // code for all the AEBs follows
}
```

An optimization in the scheduling algorithm allows a task to execute more than one AEB 20 each time it is selected from the priority queue. We call this a short context switch. With the short context switch, it is possible to save the overhead of pushing/popping a new task from the priority queue with a bypass. A full context switch is executed every so often, alternating short and full context switches with a predetermined ratio. A full context switch ensures a fair sharing of the processor among equal-priority tasks.

In order to implement the short context switch, we add a counter to the scheduling algorithm, used to keep track of the number of consecutive short context switches performed. The counter is initialized to a value representing the ratio between short and full context switches. The value of the counter defines a time quantum, i.e., a number of consecutives AEBs 20 of the same task to be executed before a full context switch. The counter is decremented at every short context switch, and a full context switch is executed once the counter reaches zero and expires. Obviously, a full context switch can happen before the counter expires, in the case that a task is blocked or terminates. Alternatively, a timer can be used in place of a counter, yielding a real time-sharing of the processor in the round-robin approach. Table 10 shows the modified scheduler algorithm, incorporating the short context switch optimization.

TABLE 10

```
queue_t *tasks
context_t *current
void scheduler( ) {
    while(tasks->size > 0) {
        if(current->status == RUNNABLE)
            tasks->push(current)
        current = tasks->pop( )
        cnt = RATIO;
        sched: {
            if(cnt-- && current->status == RUNNABLE)
                switch(current->next_aeb) {
                    case 1: goto aeb_1
                    case 2: goto aeb_2
                    ...
                }
        }
    }
    // code for all the AEBs follows
}
```

In phantom 10, and for efficiency reasons, a limited priority queue is implemented. A limited priority queue is one that allows a finite, and a priori known, number of priority levels (e.g., 32). However, this does not pose any limitations, since the number of priority levels required by the application can be provided to the phantom serializing compiler 10. The implementation of the priority queue is as follows. A separate array-based queue is allocated for each priority level, which are accessed by the scheduler in order of highest to lowest priority. Manipulation of the array-based queues at each priority level is very efficient, and takes a constant amount of time. At any given point, a reference is maintained to the highest non-empty priority queue. Given this, the overall access to the queue of runnable tasks by the scheduler requires a constant running time, regardless of the number of runnable tasks.

A discussion of experimental results will assist in providing a more concrete understanding of the invention. The phantom approach of the illustrated embodiment was successfully applied to a number of applications developed for testing the translation flow. In general, multitasking applications synthesized with phantom 10 showed a much improved performance. The reason is two fold. Firstly, the generated application encompass a highly tuned multitasking framework that meets the application' specific needs. Second, the multitasking infrastructure itself is very compact and efficient, resulting in a much lighter overhead for context switching, task creation, and synchronization. Eight different applications were implemented using the phantom POSIX interface10, so that its performance could be compared to the Unix implementation of POSIX. Unix represents a generic OS layer, similar to those that would be found in a traditional multitasking environment for embedded systems. The benchmarking applications that were used in the experiments are described in Table 11.

TABLE 11

| Name | Description |
| --- | --- |
| client_server | Client-Server implementation of a calculator. Communication through shared memory. 100 servers and 2000 clients. |
| consumer_producer | Classical consumer producer problem, 100 consumers and 100 producers. Buffer with 1000 entries. |
| dct | Multitask implementation of 8 × 8 dct. One task for each point in the result matrix. |
| deep_stack | Multiple recursive tasks. Tests the cost of recursive function calls in the Phantom system. |
| matrix_mul | Multitask implementation of matrix multiplication. Resulting matrix is 150 × 150 elements. One task per element in the result. |
| quick_sort | Multitask implementation of the traditional sorting algorithm. |
| vm | Multitask simulator for a simple processor. |
| watch | Time-keeper application, used to test timing behavior of the generated code. |

Table 12 summarizes the performance of the benchmarks with Phantom and POSIX.

TABLE 12

| Application | POSIX | Phantom | #Threads | #Ctx.Sw. |
| --- | --- | --- | --- | --- |
| client_server | 5.14 s | 1.84 s | 501 | 110179 |
| consumer_producer | 7.23 s | 3.54 s | 201 | 2000198 |
| dct | 1.02 s | 0.49 s | 12673 | 32670 |
| deep_stack | 2.05 s | 0.84 s | 1001 | 91556 |
| matrix_mul | 1.10 s | 0.55 s | 22501 | |
| quick_sort | 2.97 s | 1.12 s | 6640 | 11019 |
| vm | 2.83 s | 5.35 s | 501 | 3834 |
| watch | 67.01 s | 67.00 s | 2 | 1492 |

Figure 6:
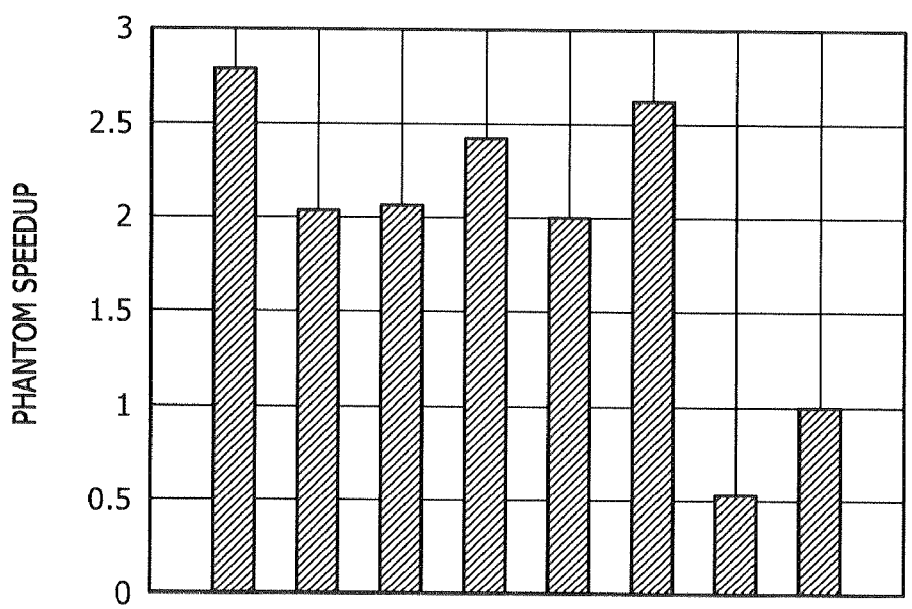
FIG. 6 is a bar graph which depicts the speed-up obtained for each application in Table 11 by using the phantom compiler.

All benchmarks were executed on an UltraSPARC-I le workstation with 256 Mb of RAM. One can easily see that phantom 10 outperforms standard UNIX-POSIX implementations, being 2 to 3 times faster in execution time. FIG. 6 is a graph which plots the speed-up obtained for each application in Table 11 by using phantom 10. On the average, multitasking with phantom 10 achieved a speed-up of 2.07, with a maximum of 2.8. These results are especially due to the lightweight implementation of phantom 10, and as a consequence of being able at compile time to generate specific code for each different application.

It is important to point out that with embedded applications, being fast is not always the most desired functionality. Instead, many times we are interested only in being accurate and precise, i.e., meeting time constrains, given that embedded systems interact with the physical environment in a very constant manner. In that sense, Watch is an application of our benchmark that is worth discussing further. Watch was implemented as two tasks, a background task that periodically updates physical time information, including hours, minutes, seconds, and milliseconds to a shared data structure, and a foreground task that uses the shared data structure to perform some action. Further, the foreground task waits for 67 seconds before terminating itself. The overhead of the phantom generated code was sufficiently efficient not to disturb the timing behavior of this particular application.

Consider partitioning exploration. We used the same algorithms of Table 11 to evaluate the impact of partitioning in the generated code. We applied the partitioning exploration methodology described earlier to obtain pareto-optimal sets of partitions for all the applications. FIGS. 7-10 show the resulting pareto-optimal partitions for the most interesting cases. Overall, we observe the trend of increased overhead as latency is reduced (i.e., more partitions are created). Furthermore, by using different partitioning schemes, it is possible to modify latency by as much as two orders of magnitude at the expense of an increase in the overhead by a factor of 120.

Figure 7:
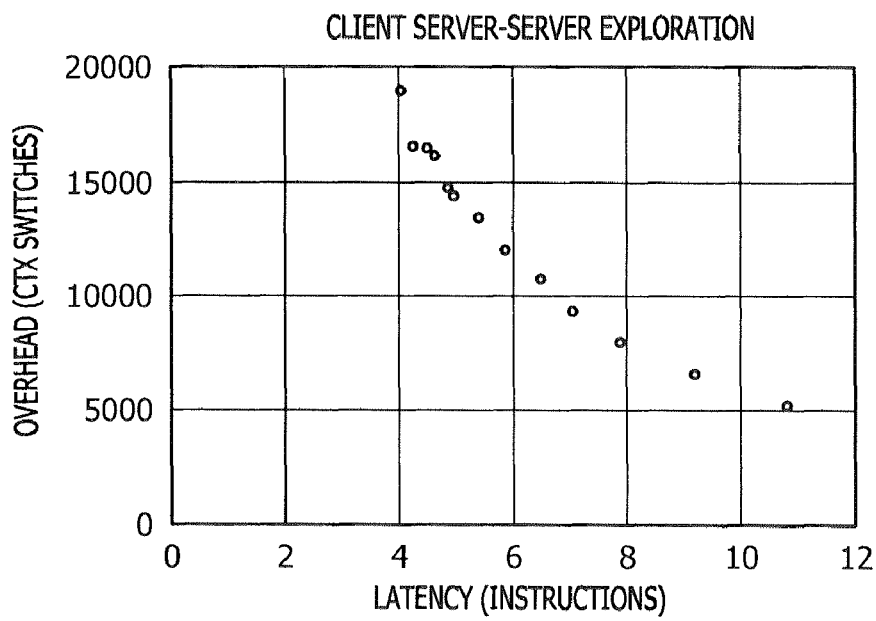
FIG. 7 is a graph of overhead verses latency for the pareto-optimal partitions for the function, Server, in the Client Server benchmark in Table 11.

FIG. 7 shows the pareto-optimal partitions for the function, Server, in the Client Server benchmark. In this example, there is a fairly regular behavior. The maximum and the minimum partitions differ by a factor of 3 in latency, and by a factor of 3.5 in performance. The range of latencies is covered reasonably well by our partitioning methodology.

Figure 8:
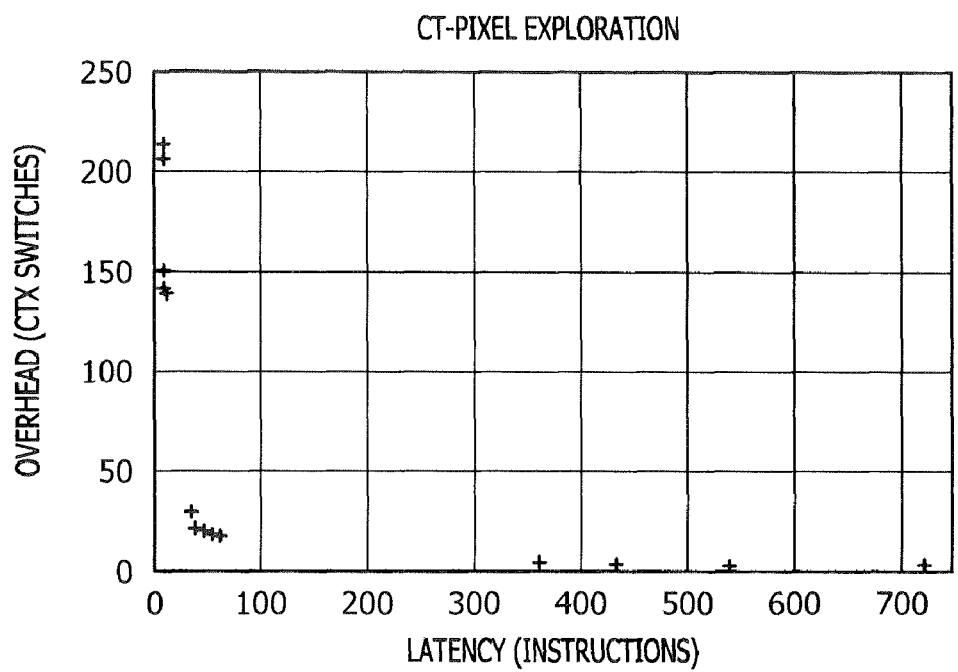
FIG. 8 is a graph of overhead verses latency for the pareto-optimal partitions of function Fpixel in DCT in Table 11.

A completely different picture is shown in FIG. 8, the pareto-optimal partitions for function fpixel in DCT. Here, latency ranges from a large 720 instruction delay to a tiny 5 instruction delay on the other extreme. The overhead also changes significantly, from a minimal number of context switches in one case to a large overhead in the other. Moreover, it is possible to detect islands of partitions as we break the code in different parts. One can identify at least four separate grouping of the pareto-optimal partitions.

Figure 9:
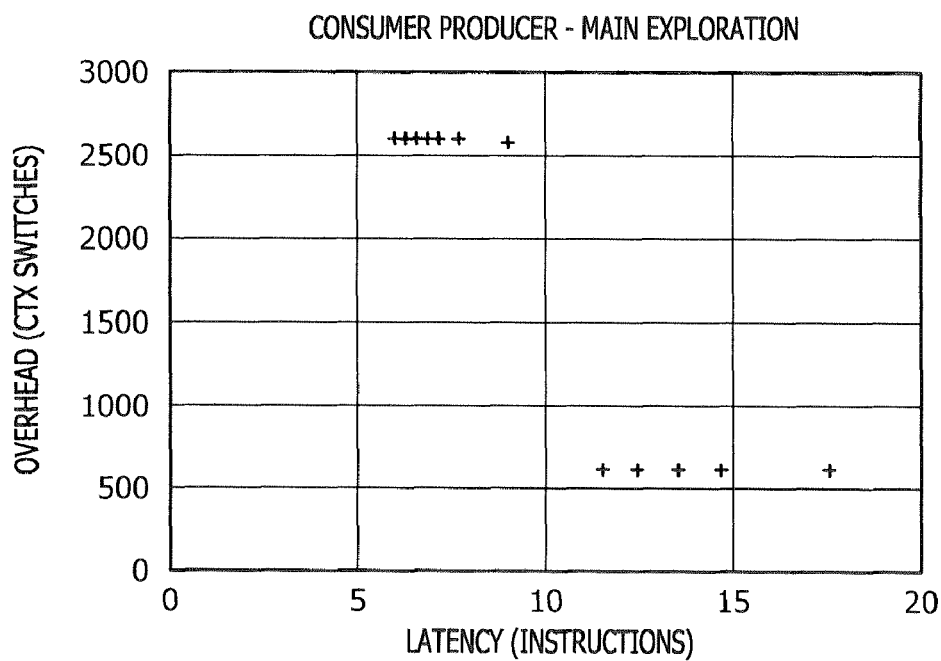
FIG. 9 is a graph of overhead verses latency for the pareto-optimal partitions of the Consumer Producer benchmark in Table 11.

FIG. 9 shows yet a different scenario as a result of phantomizing function main of the Consumer Producer benchmark. Here, the latency reduces very quickly with almost no penalty in performance up to a certain point. Then, for a quite small improvement in latency, there is a huge penalty in performance. After that, latency continues to decrease at almost no cost. In this case, it is easy to estimate that the large cost imposed by one specific partition is caused by breaking a large for loop, causing a context switch to happen at every iteration of the loop.

Figure 10:
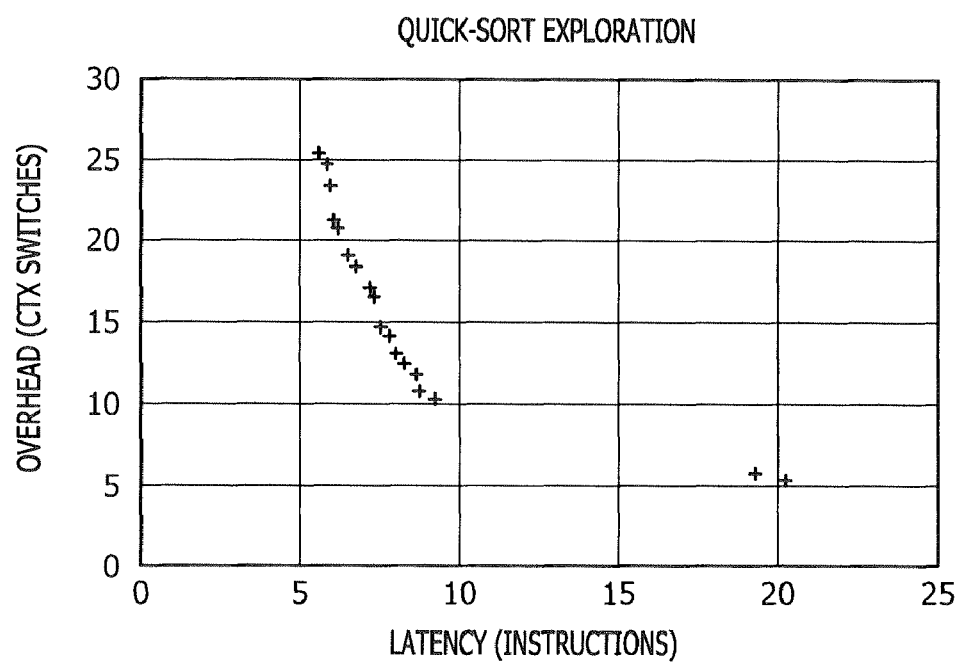
FIG. 10 is a graph of overhead verses latency for the pareto-optimal partitions of the Quick Sort function in Table 11.

Finally, FIG. 10 shows the pareto-optimal partitions for the Quick Sort function, and again we have a different picture. Here, there is a large gap in reducing the average latency initially. Once that barrier is broken, latency can be further reduced, but in the processes, the overhead increases at a steep rate, being almost 5 times higher than the case with the largest partitions.

Table 13 details the minimum, maximum, and average latency; standard deviation; and context switching overhead for some of the partitions explored in the Quick Sort function.

TABLE 3

| part number | min latency | max latency | avg latency | std deviation | ctx_sw overhead |
|---|---|---|---|---|---|
| 0 | 4 | 100.7 | 20.2 | 32.9 | 5.5 |
| 1 | 4 | 87.2 | 19.4 | 26.5 | 6.0 |
| 2 | 4 | 34.3 | 9.3 | 9.3 | 10.3 |
| 13 | 4 | 12.3 | 6.5 | 3.3 | 18.9 |
| 16 | 4 | 11.0 | 5.9 | 3.2 | 23.3 |
| 18 | 4 | 11.0 | 5.6 | 3.4 | 25.0 |

The table shows that, for the larger partitions, the average latency is high, but standard deviation is also high, due to the highly irregular sizes of each cluster, while the overhead due to context switching is minimal. Then, as the clustering methodology explores different partitions, one can see that the latency and the standard deviation are reduced significantly, resulting in a more uniform clustering.

Consider phantom performance. A set of synthetic benchmarks was implemented to evaluate the overhead imposed by the phantom multitasking infrastructure. Various parameters of phantom 10 were evaluated, like context switching overhead, task creation cost, task joining cost, and mutex synchronization cost. Mutex is an acronym for mutual exclusion object. A mutex is a program object that allows multiple program threads to share the same resource, such as file access, but not simultaneously. When a program is started, a mutex is created with a unique name. After this stage, any thread that needs the resource must lock the mutex from other threads while it is using the resource. The mutex is set to unlock when the data is no longer needed or the routine is finished. Cost was measured as the average number of instructions executed on the host processor for performing a particular operation (e.g., task creation, task joining, etc.) We compiled and executed the applications on the UltraSPARC-IIe workstation, running Solaris operating system. We used Cputrack tool to obtain number of instructions and CPU cycles executed by a target program. (Cputrack uses hardware counters to track CPU usage). All benchmarks were compiled with GCC v3.3. The time cost of each metric was calculated from the average CPI (cycles per instruction) of each benchmark, associated with the processor cycle time.

For each benchmark, designed to measure a particular metric, we first obtained a baseline execution count. The baseline execution count accounted for all the computation code less the phantom generated multitasking infrastructure. Then, the multitasking infrastructure was enabled and instruction counts were re-evaluated. The difference between the baseline and the version with the multitasking infrastructure gave us a measure of the performance of phantom 10 for that metric. All experiments in this phase were performed using at most one task active and a single priority level. On average, phantom multitasking infrastructure overhead is small, and has an impact of less than 1% in the execution time of the synthetic benchmarks. Our results are summarized in Table 14.

TABLE 14

| | No optimization (-O0) | | With optimization (-O2) | |
|---|---|---|---|---|
| Metric | Instructions | Time (µs) | Instructions | Time (µs) |
| full context switch | 427 | 1.81 | 206 | 0.47 |
| short context switch | 82 | 0.35 | 37 | 0.08 |
| mixed context switch (10:1) | 124 | 0.52 | 58 | 0.13 |
| task creation | 1113 | 4.74 | 833 | 1.90 |

TABLE 14-continued

| | No optimization (-O0) | | With optimization (-O2) | |
|---|---|---|---|---|
| Metric | Instructions | Time (µs) | Instructions | Time (µs) |
| task join | 506 | 2.15 | 227 | 0.52 |
| mutex lock | 68 | 0.29 | 40 | 0.09 |

Figure 11:
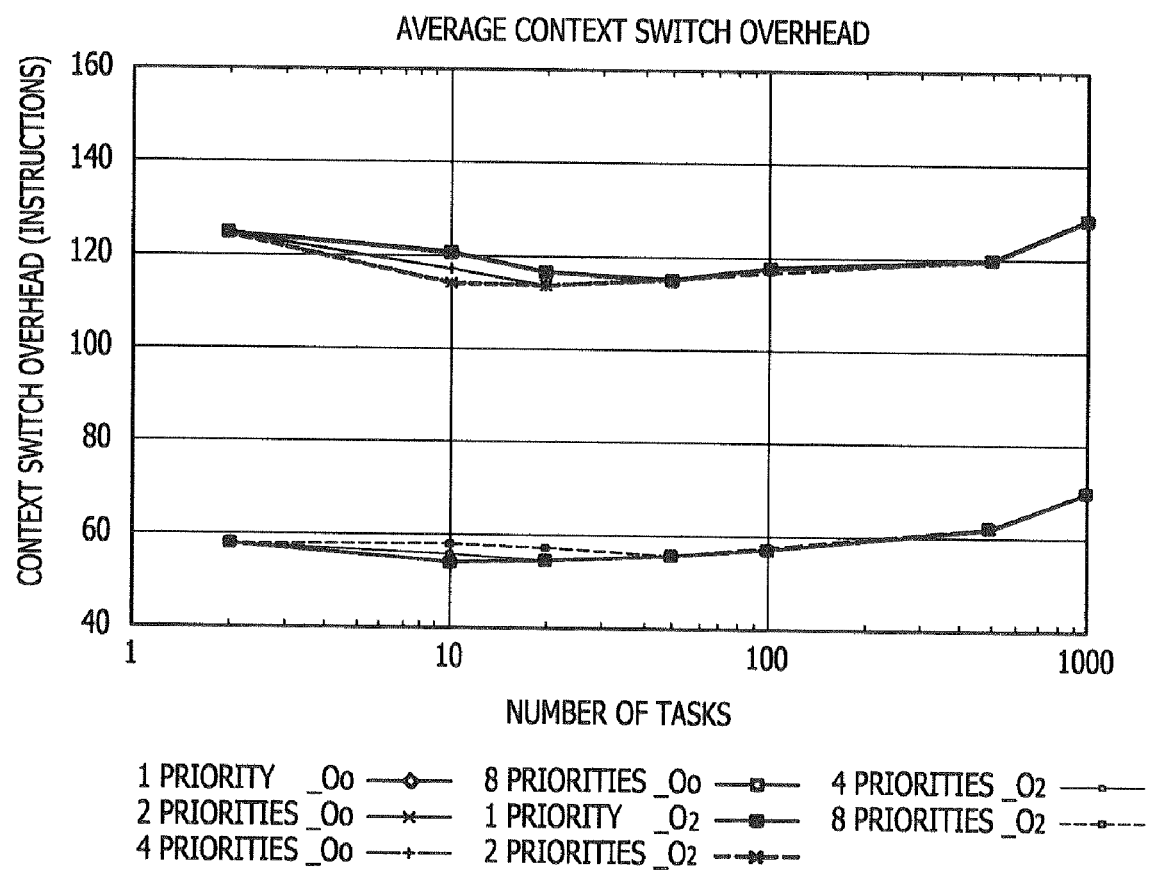
FIG. 11 is a graph showing the average number of instructions/time for performing a short context switch verses the number of runnable tasks in the system (i.e., one of 2, 10, 20, 50, 100, 500, and 1000 tasks) with a mixed scheduler with a 10:1 ratio between short and full context switches.
Figure 12:
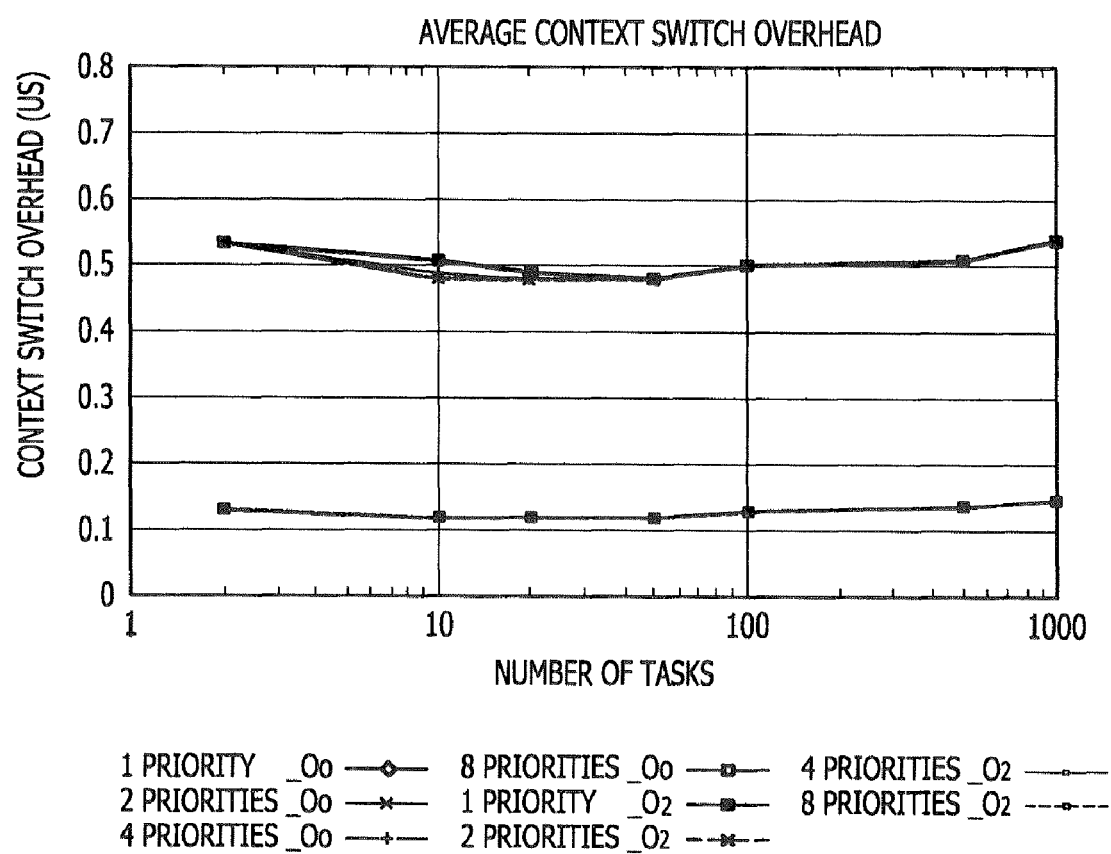
FIG. 12 is a graph showing the average number of instructions/time for performing a full context switch verses the number of runnable tasks in the system (i.e., one of 2, 10, 20, 50, 100, 500, and 1000 tasks) with a mixed scheduler with a 10:1 ratio between short and full context switches.

Next, we evaluated the impact of multiple task and multiple priorities in a task context switch. In these experiments, we used a mixed scheduler, with a 10:1 ratio between short and full context switch. FIGS. 11 and 12 show the results. Here, the horizontal axis of the plot depicts the number of runnable tasks in the system (i.e., one of 2, 10, 20, 50, 100, 500, and 1000 tasks). The vertical axis of the plot depicts the average number of instructions/time for performing a context switch.

We note from FIGS. 11 and 12 that the overhead of task creation and context switch is small, fairly constant, and independent of the number of runnable tasks in the system. Contrary to intuition, there is initially a slight decrease in the context switch time when the number of tasks increase. With a small number of tasks, there are more reorganizations in the priority queue, since every context switch can possibly insert a task with a different priority in the queue. As the number of tasks increase, reorderings are less constant, since a task with the same priority is likely to be in the queue already. Therefore, context switch is slightly faster. Nevertheless, the impact of phantom 10 in the execution time of the benchmarks is typically less than 1%, for the applications tested. A similar trend is observed with respect to the number of priorities, i.e., increasing the number of priorities does not have a significant impact on context switch time. As before, there is a slight difference in context switch time when few tasks are present. In this case, the priority queue has to be reorganized more often, increasing the context switch by a small margin. The efficiency of the phantom generated code makes it practical for designing multimedia, digital signal processing, or other highly parallel applications, using the concurrent programming model.

In summary, we have disclosed a scheme for source-to-source translation of a multitasking application written in C extended with POSIX into a single-threaded ANSI C program which can be compiled using a standard C compiler for any target embedded processor. While compiler tool chains are commonly available for any of the large number of customized embedded processors, the same is not true for operating systems, which traditionally provides the primitives for multitasking at the application level. Our source-to-source translator fills this missing OS gap by automatically generating a platform independent C program that encapsulates multitasking support customized for the input application.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated, that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of operating a computer to generate a program for an embedded processor comprising:
   compiling a multitask application with a generic front-end compiler to generate a basic block (BB) control flow graph (CFG) of the multitask application;
   generating non-preemptive blocks of code from the control flow graph (CFG) with a partitioning module, which blocks of code are defined as AEB (atomic execution blocks) graphs;
   performing a live variable analysis on the AEB graphs to generate a live variable result;
   feeding back the live variable result to the partitioning module to refine the AEB graphs until preemption, timing, and latency constraints are met, the AEB graphs having determined AEB nodes; and
   generating a corresponding executable code for each AEB node in a code generator.

2. The method of claim 1 where generating a corresponding executable code for each AEB node in a code generator further comprises generating an embedded scheduler along with data structures and synchronization APIs from a system support library to result in the final single-threaded code.

3. The method of claim 2 further comprising selecting and executing a task by means of the embedded scheduler by activating a corresponding AEB of the task to be executed according to a selected one of a plurality of priority based schemes depending on priorities of the tasks.

4. The method of claim 1 where generating the basic block (BB) control flow graph (CFG) of the multitask application comprises generating an intermediate basic block representation which is annotated to identify system primitives.

5. The method of claim 4 where generating the basic block (BB) control flow graph (CFG) of the multitask application comprises identifying phantom primitives by a phantom calls identifier.

6. The method of claim 1 where compiling the multitask application with a generic front-end compiler comprises compiling a multitask C application and where generating the corresponding executable code for each AEB node in a code generator comprises generating an ANSI C single-threaded code.

7. The method of claim 1 where generating the corresponding executable code for each AEB node in a code generator comprises generating a self-sufficient binary for the embedded processor.

8. The method of claim 1 where feeding back the live variable result to the partitioning module to refine the partitions until acceptable preemption, timing, and latency are achieved comprises partitioning tasks, Ti, into the AEB graph whose nodes are AEBs and whose edges represent control flow.

9. The method of claim 1 where generating non-preemptive blocks of code from the control flow graph (CFG) with a partitioning module comprises generating non-preemptive blocks of code corresponding to a function f in the original input code into more than one AEB, each AEB being implemented as a separate region of code, storing values of local variables of f in a structure inside a task context to emulate a function frame, which local variables are live on transition from one AEB to the other, so that the transfer of one AEB to another is transparent to the task, and maintaining a copy of local variables during the execution of f as part of its task context for every function f.

10. The method of claim 9 further comprising creating a frame of a partitioned function f in a special function, fsetup, and cleaning up the frame in the last AEB of f in a special function, fcleanup for every function that is partitioned.

11. The method of claim 1 further comprising maintaining during runtime a reference to a next-aeb node to be executed in the future in the context information for each task by allocating a context when a task is created, initializing a next-aeb field to an entry AEB of the task, and pushing the task context onto a queue of existing tasks to be processed by the embedded scheduler.

12. The method of claim 1 where generating non-preemptive blocks of code from the control flow graph (CFG) with a partitioning module comprises identifying synchronization points within the control flow graph (CFG).

13. The method of claim 1 where generating non-preemptive blocks of code from the control flow graph (CFG) with a partitioning module comprises treating code for an interrupt service routine, I, as a task, with its associated AEBs with a priority higher than all existing tasks and if multiple interrupts destined for 1 occur, creating multiple tasks and scheduling the multiple tasks for execution.

14. The method of claim 1 where generating non-preemptive blocks of code from the control flow graph (CFG) with a partitioning module comprises partitioning the control flow graph (CFG) at predetermined boundaries for correctness, including when a function is an entry point of a task, when a function calls a phantomized function, when a task invokes a synchronization operation, when a task creates another task, or at manually programmed specific points in the code where a context switch occurs by calling a yield function of a phantom API.

15. The method of claim 1 where generating non-preemptive blocks of code from the control flow graph (CFG) with a partitioning module comprises partitioning the control flow graph (CFG) at predetermined boundaries according to an evaluation of: average, minimum, and maximum latency; standard deviation of latency; or context switch overhead.

16. The method of claim 15 partitioning the control flow graph (CFG) at predetermined boundaries comprises using generic clustering or seeking a pareto-optimal partition.

17. The method of claim 16 where the generic clustering comprises modifying the original control flow graph CFG to add extra precedence nodes to nodes that contain identified synchronization points and to nodes that are manually programmed specific points.

18. The method of claim 16 where the generic clustering comprises assigning each node of the control flow graph CFG to its own cluster, and later merging the clusters according to precedence/dependence relationship between nodes in the control flow graph CFG.

19. The method of claim 18 where merging the clusters comprises merging two clusters if all their predecessors are in the same cluster.

20. The method of claim 18 where the generic clustering comprises merging the clusters until all predecessors are considered in the merging process, which stops when no more merging is possible.

21. The method of claim 1 partitioning the control flow graph (CFG) at predetermined boundaries comprises generating a pareto-optimal partition by partitioning using a cooperative scheduling model only the partitions of code mandatory for correct multithreading, instrumenting the code with timing probes to generate profiling information for each AEB executed, checking each AEB for compliance with predetermined constraints, searching for loops in all noncompliant AEBs, and repartitioning the loops in the noncompliant AEBs with revised loops, and repeating the steps of partitioning using a cooperative scheduling model, instrumenting the code with timing probes, checking each AEB for compliance, searching for loops, and repartitioning the loops in the non-compliant AEBs until all predetermined constraints are met, then synthesizing a final version of the code without the timing probes.

22. The method of claim 21 where repartitioning the loops in the noncompliant AEBs with revised loops comprises enclosing the loop body within an external FOR loop, which repeats the AEB execution N times before preempting the loop and returning to the scheduler, where N is computed from an average execution time of the loop body or a worst case execution time (WCET) of the loop body.

23. A computer arranged and configured to generate a program for an embedded processor comprising:
a processor and memory;
a generic front-end compiler to generate a basic block (BB) control flow graph (CFG) from a multitask application;
a partitioning module for generating non-preemptive blocks of code from the control flow graph (CFG), which blocks of code are defined as AEB (atomic execution blocks) graphs,
a live variable analyzer to generate a live variable result from the AEB graphs, which live variable result to is fed back to the partitioning module to refine the AEB graphs until preemption, timing, and latency constraints are met, the AEB graphs having determined AEB nodes; and
a code generator for generating a corresponding executable code for each AEB node.

24. The computer of claim 23 where the code generator further comprises means for generating an embedded scheduler along with data structures and synchronization APIs from a system support library to result in the final single-threaded code.

25. The computer of claim 24 where the embedded scheduler selects and executes a task by activating a corresponding AEB of the task to be executed according to a selected one of a plurality of priority based schemes depending on priorities of the tasks.

26. The computer of claim 23 where the partitioning module comprises means for generating an intermediate basic block representation which is annotated to identify system primitives.

27. The computer of claim 26 where the partitioning module comprises means for generating identifying phantom primitives by a phantom calls identifier.

28. The computer of claim 23 where the front-end compiler comprises a compiler for a multitask C application and where the code generator comprises means for generating an ANSI C single-threaded code.

29. The computer of claim 23 where the code generator comprises means for generating a self-sufficient binary for the embedded processor.

30. The computer of claim 23 where the partitioning module and live variable analyzer coact to partition tasks, Ti, into the AEB graph whose nodes are AEBs and whose edges represent control flow.

31. The computer of claim 23 where the partitioning module comprises means for generating non-preemptive blocks of code corresponding to a function f in the original input code into more than one AEB, each AEB being implemented as a separate region of code, storing values of local variables of f in a structure inside a task context to emulate a function frame, which local variables are live on transition from one AEB to the other, so that the transfer of one AEB to another is transparent to the task, and maintaining a copy of local variables during the execution of f as part of its task context for every function f.

32. The computer of claim 31 where the partitioning module further comprises means for creating a frame of a partitioned function f in a special function, fsetup, and cleaning up the frame in the last AEB of f in a special function, fcleanup for every function that is partitioned.

33. The computer of claim 23 where the partitioning module comprises means for maintaining during runtime a reference to a next-aeb node to be executed in the future in the context information for each task by allocating a context when a task is created, means for initializing a next-aeb field to an entry AEB of the task, and means for pushing the task context onto a queue of existing tasks to be processed by the embedded scheduler.

34. The computer of claim 23 where the partitioning module comprises means for generating synchronization points within the control flow graph (CFG).

35. The computer of claim 23 where the partitioning module comprises means for treating code for an interrupt service routine, I, as a task, with its associated AEBs with a priority higher than all existing tasks and if multiple interrupts destined for I occur, means for creating multiple tasks and means for scheduling the multiple tasks for execution.

36. The computer of claim 23 where the partitioning module comprises means for partitioning the control flow graph (CFG) at predetermined boundaries for correctness, including when a function is an entry point of a task, when a function calls a phantomized function, when a task invokes a synchronization operation, control flow graph (CFG) when a task creates another task, or at manually programmed specific points in the code where a context switch occurs by calling a yield function of a phantom API.

37. The computer of claim 23 where the partitioning module comprises means for partitioning the control flow graph (CFG) at predetermined boundaries according to an evaluation of: average, minimum, and maximum latency; standard deviation of latency; or context switch overhead.

38. The computer of claim 37 where the means for partitioning the control flow graph (CFG) at predetermined boundaries comprises means for using generic clustering or means for seeking a pareto-optimal partition.

39. The computer of claim 38 where the means for using generic clustering comprises means for modifying the original control flow graph CFG to add extra precedence nodes to nodes that contain identified synchronization points and to nodes that are manually programmed specific points.

40. The computer of claim 38 where the means for using generic clustering comprises means for assigning each node of the control flow graph CFG to its own cluster, and means for later merging the clusters according to precedence/dependence relationship between nodes in the control flow graph CFG.

41. The computer of claim 40 where merging the clusters comprises means for merging two clusters if all their predecessors are in the same cluster.

42. The computer of claim 40 where the means for using generic clustering comprises means for merging the clusters until all predecessors are considered in the merging process, which stops when no more merging is possible.

43. The computer of claim 23 further comprising a pareto-optimal partition module comprising a partitioner using a cooperative scheduling model to only generate mandatory partitions of the code for correct multithreading, to instrument the code with timing probes to generate profiling information for each AEB executed and to so execute the code, a timing analyzer for checking each AEB for compliance with predetermined constraints and for searching for loops in all noncompliant AEBs, a loop partitioner for repartitioning the loops in the noncompliant AEBs with revised loops, which code is then fed back to the generic front-end compiler until all predetermined constraints are met, after which the code generator synthesizes a final version of the code without the timing probes.

44. The method of claim 43 where loop partitioner for repartitioning the loops in the noncompliant AEBs with revised loops comprises means for enclosing the loop body within an external FOR loop, which repeats the AEB execution N times before preempting the loop and returning to the scheduler, where N is computed from an average execution time of the loop body or a worst case execution time (WCET) of the loop body.

45. An improvement in a computer comprising:
a fully automated source-to-source translator which takes a multitasking C program as input and generates an equivalent, embedded processor independent, single-threaded ANSI C program stored in the computer; and
a compiler stored in the computer which uses an embedded processor-specific tool chain for compiling the ANSI C program to generate a correct-by-construction ANSI C program that embodies an application-specific embedded scheduler and dynamic multitasking infrastructure along with a user code.

46. The improvement of claim 45 where the compiler which compiles the multitasking C application comprises a generic front-end compiler to obtain the basic block (BB) control flow graph (CFG) representation.

47. The improvement of claim 45 where the compiler comprises means for identifying system primitives.

48. The improvement of claim 45 where the compiler comprises an embedded scheduler and a partitioning module to generate non-preemptive blocks of code, defined as AEBs (Atomic Execution Blocks), to be executed by the scheduler.

49. The improvement of claim 48 where the partitioning module partitions every task in the multitasking C program into a plurality of AEBs to generate an AEB Graph, and further comprising a live variable analysis means to operate on the AEB graphs to generate an output that is fed back to the partitioning module to refine the partitions until user-defined levels of preemption, timing, and latency constraints are met.

50. The improvement of claim 48 further comprising a code generator and where the partitioning module passes accepted AEB graphs to the code generator to output the corresponding ANSI C code for each AEB node in the AEB graphs.

51. The improvement of claim 48 further comprising a system support library with C data structures and synchronization APIs which are included with the embedded scheduler in the final ANSI C single-threaded code.

\* \* \* \* \*

UNITED STATES PATENT AND TRADEMARK OFFICE
CERTIFICATE OF CORRECTION

PATENT NO. : 7,886,283 B2  Page 1 of 1
APPLICATION NO. : 11/227781
DATED : February 8, 2011
INVENTOR(S) : Nacul et al.

It is certified that error appears in the above-identified patent and that said Letters Patent is hereby corrected as shown below:

Column 26, line 62, in Claim 13, delete "for 1" and insert -- for I --.

Column 27, line 17, in Claim 17, delete "CFG" and insert -- (CFG) --.

Column 27, line 22, in Claim 18, delete "CFG" and insert -- (CFG) --.

Column 27, line 25, in Claim 18, delete "CFG." and insert -- (CFG). --.

Column 29, line 19, in Claim 39, delete "CFG" and insert -- (CFG) --.

Column 29, line 24, in Claim 40, delete "CFG" and insert -- (CFG) --.

Column 29, line 27, in Claim 40, delete "CFG." and insert -- (CFG). --.

Column 30, line 1, in Claim 44, delete "method" and insert -- computer --.

Column 30, line 33, in Claim 49, delete "Graph," and insert -- graph, --.

Signed and Sealed this
Seventh Day of June, 2011

David J. Kappos
*Director of the United States Patent and Trademark Office*